(12) United States Patent
Webster et al.

(10) Patent No.: US 10,851,244 B2
(45) Date of Patent: Dec. 1, 2020

(54) ACETOACETYLATED AND (METH)ACRYLATED LIGNIN AND THERMOSETS THEREFROM

(71) Applicant: NDSU RESEARCH FOUNDATION, Fargo, ND (US)

(72) Inventors: Dean C. Webster, Fargo, ND (US); Eric Krall, Fargo, ND (US); Kelly M. Sutko, N. Maple Grove, MN (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 85 days.

(21) Appl. No.: 15/794,500

(22) Filed: Oct. 26, 2017

(65) Prior Publication Data

US 2018/0305550 A1 Oct. 25, 2018

Related U.S. Application Data

(60) Provisional application No. 62/413,225, filed on Oct. 26, 2016.

(51) Int. Cl.
*C08L 97/00* (2006.01)
*C08K 5/10* (2006.01)
(Continued)

(52) U.S. Cl.
CPC .............. *C08L 97/005* (2013.01); *C08H 6/00* (2013.01); *C08K 5/10* (2013.01); *C08K 5/1515* (2013.01)

(58) Field of Classification Search
CPC ........... C08L 97/005; C08H 6/00; C08K 5/10; C08K 5/1515
(Continued)

(56) References Cited

FOREIGN PATENT DOCUMENTS

CN 105780474 A * 7/2016

OTHER PUBLICATIONS

Dziurka et al., "The Effect of Grafting Particles with Acetoacetyl Groups on the Properties of Particleboards," Elec. J. Polish Agric. Univ., Wood Tech., vol. 6, Issue 2 [retrieved on Apr. 13, 2019]. Retrieved from the Internet: < URL: http://www.ejpau.media.pl/articles/volume6/issue2/wood/art-02.pdf > (Year: 2003).*

(Continued)

*Primary Examiner* — Josephine L Chang
(74) *Attorney, Agent, or Firm* — J.A. Lindeman & Co. PLLC

(57) ABSTRACT

The invention relates to novel acetoacetylated lignin resin compositions comprising the reaction product of lignin and an acetoacetate ester. The invention also relates to novel (meth)acrylated lignin resin compositions comprising the reaction product of lignin and a (meth)acrylic compound. The invention also relates to methods of making the novel acetoacetylated lignin resin compositions and the novel (meth)acrylated lignin resin compositions. The invention also relates to curable coating compositions comprising the novel acetoacetylated lignin resin composition or (meth)acrylated lignin resin composition. The invention also relates to methods of making the curable coating compositions of the invention. The invention also relates to methods of applying curable coating compositions of the invention to substrates. The invention also relates to articles of manufacture comprising a curable coating composition of the invention and a method of making such article.

16 Claims, 13 Drawing Sheets

(51) Int. Cl.
*C08K 5/1515* (2006.01)
*C08H 7/00* (2011.01)

(58) Field of Classification Search
USPC .......................................................... 524/73
See application file for complete search history.

(56) References Cited

OTHER PUBLICATIONS

CN 105780474 A, machine translation, EPO Espacenet. (Year: 2016).*

* cited by examiner

ACETOACETYLATED AND (METH)ACRYLATED LIGNIN AND THERMOSETS THEREFROM

CROSS-REFERENCE TO RELATED APPLICATIONS

This application claims priority to U.S. Provisional Application No. 62/413,225, filed Oct. 26, 2016. The disclosure of this provisional application is incorporated herein by reference.

STATEMENT OF US GOVERNMENT SUPPORT

This invention was made with government support under IIA-1330840 and IIA-1355466 awarded by the National Science Foundation (NSF). The US government has certain rights in the invention.

BACKGROUND OF THE INVENTION

Lignin is the most abundant aromatic bio-polymer in nature. Lignin is a key component of woody plants and is found in the cell walls of plants that grow on dry land. Lignin's rigidity and protects the plant from microbial degradation. Unlike other plant-based polymers, lignin is not made up of carbohydrate monomers. Lignin is a polymer made up of a mixture of aromatic alcohols, the monolignols. Lignin is synthesized via an enzymatic oxidation and subsequent free radical polymerization of its monomeric monolignol constituents. Monolignols include p-coumaryl alcohol, coniferyl alcohol, and sinapyl alcohol. Lignin therefore possesses significant hydroxyl functionality. Commercially, lignin is sourced from wood products and produced in a pulping process to convert wood into wood pulp and extract cellulose. One type of lignin, Kraft lignin results from the Kraft or sulfate pulping process which uses sodium hydroxide and sodium sulfide to break the bonds between lignin and cellulose.

Currently lignin is treated as a waste product in the pulp and paper industries and is burned to provide energy for cellulose extraction. With green chemistry and other environmental concerns in mnd, a need exists to find productive uses for lignin beyond its current limited uses.

DESCRIPTION OF THE INVENTION

Figure 1A:
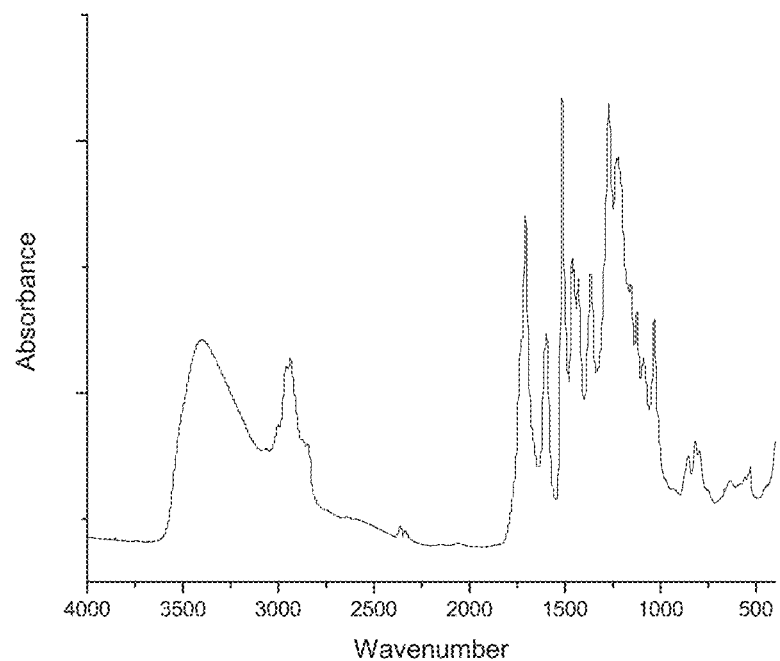
FIGS. 1a-d show the FTIR spectra for the depolymerized Kraft lignin described in Example 1, reactions 1-1, 1-3, 1-4, and 1-7, respectively.
Figure 1B:
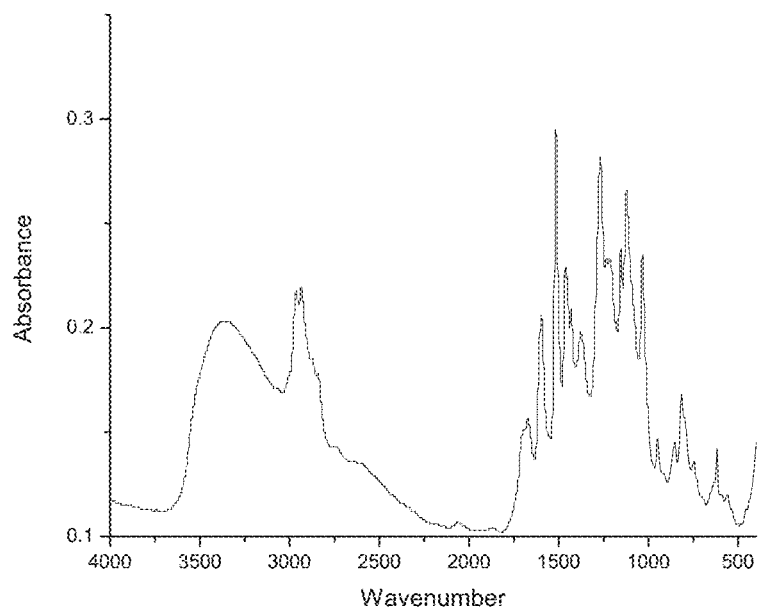
Figure 1C:
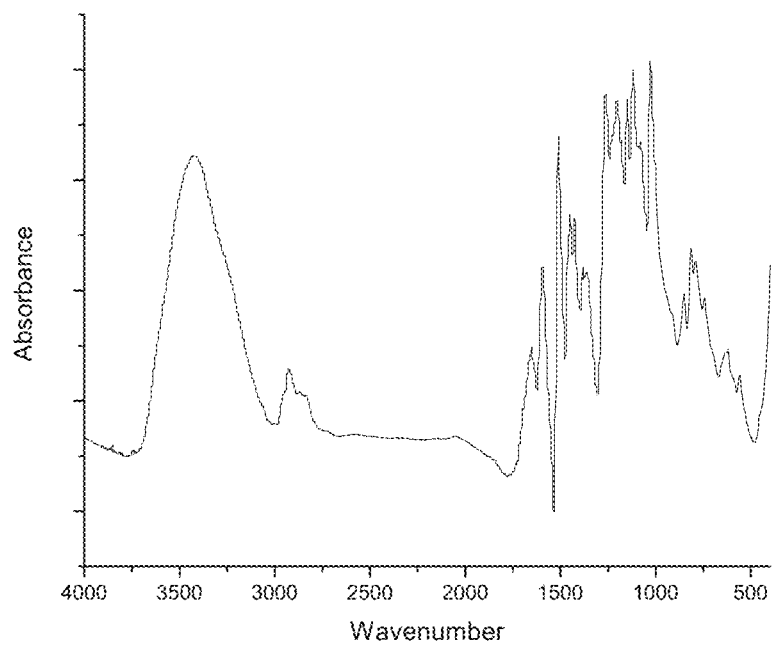
Figure 1D:
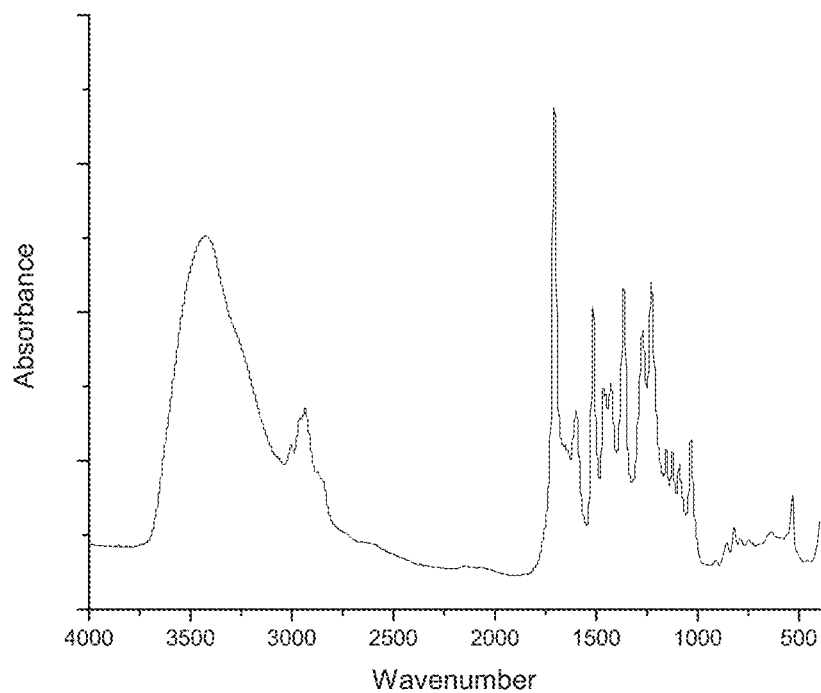

The resins of the invention are based on lignin, a byproduct of paper pulping, and thus could be low cost bio-based resins. Being a direct by-product of pulping processes makes lignin an excellent source of terrestrial carbon that could be developed into thermoplastic and thermosetting polymers. The resins of the invention may be prepared using lignin directly as produced. Lignin can also be degraded (depolymerized) into lower molecular weight compounds usng methods known the art. Lignin and depolymerized lignin contain both aliphatic and aromatic hydroxyl groups. Resins of the invention may be prepared using lignin or depolymerized lignin.

Lignin and depolymerized lignin contain both aliphatic and aromatic hydroxyl groups. Taking advantage of this hydroxyl functionality, the invention relates to functionalizing lignin to introduce acetoacetate functionality. An advantage of acetoacetylated lignin is that it should have a lower viscosity than lignin due to a reduction of hydrogen bonding. Sufficient amounts of acetoacetylation should also render the functionalized lignin a viscous liquid. The acetoacetylated lignin can be crosslinked to form thermosets by reaction with amines, polyisocyanates, or melamine-formaldehyde resins.

According to the invention, lignin is functionalized with acetoacetate groups. Lignin may be used as it is produced in a pulping process or may be depolymerized first using methods known in the art prior to functionalization or it may be functionalized with acetoacetate groups directly. An acetoacetylated lignin of the invention has improved solubility over lignin and is a viscous liquid rather than a solid.

Acetoacetate groups may be introduced into a lignin by transesterification with an acetoacetate molecule, such as t-butyl acetoacetate, tBAA. Reaction 1 shows this below. The esterification of a polyol to form acetoacetylated polyols is known in the art and has been described in U.S. Pat. No. 4,551,523, which is incorporated herein by reference.

Reaction 1

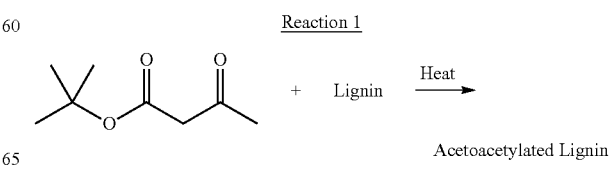

Acetoacetylated Lignin

Representative structures of Kraft lignin and acetoacetylated Kraft lignin are shown below. A representative structure of depolymerized lignin (also known as partially depolymerized lignin) is also shown below where "n" indicates its remaining polymeric nature. The "R" groups indicate other portions of the lignin due to its complex structure.

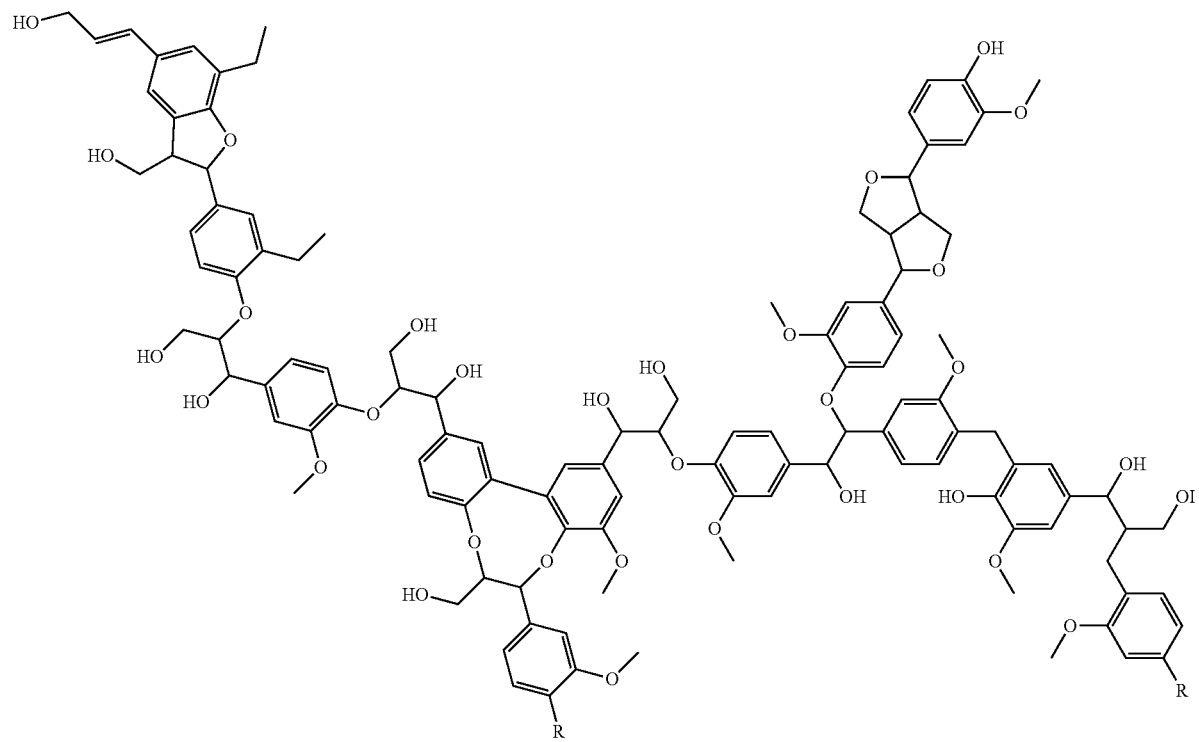

(A) Representative structure of Kraft Lignin.

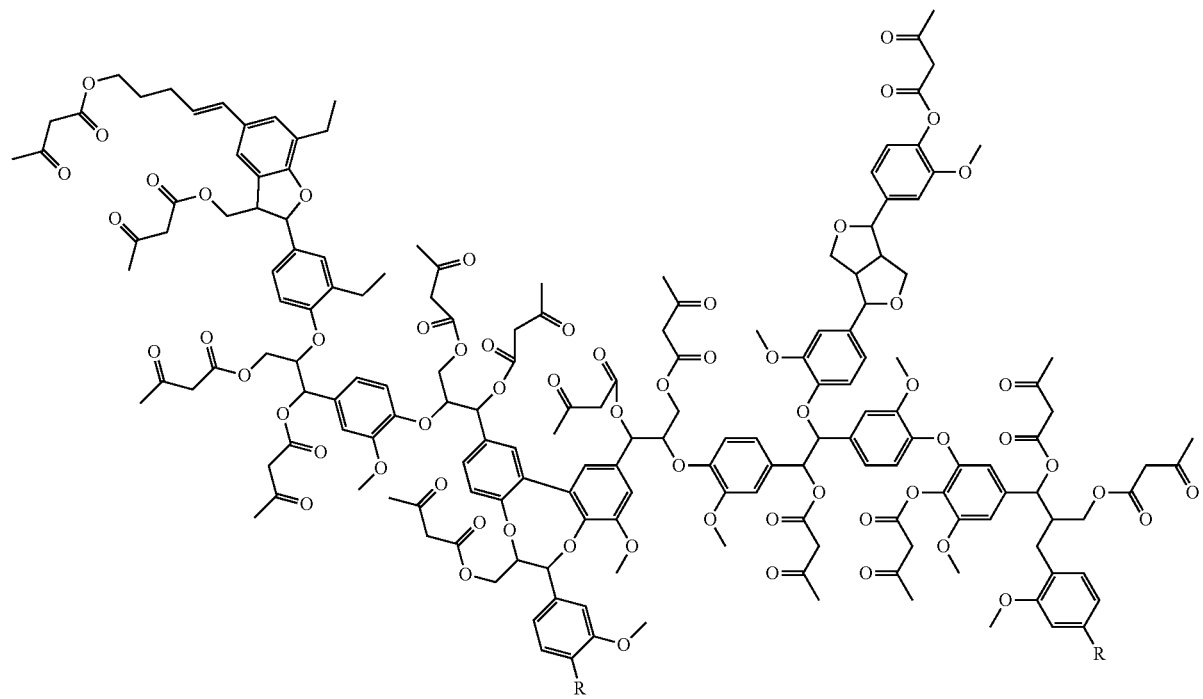

(B) Representative structure of acetoacetylated Kraft Lignin.

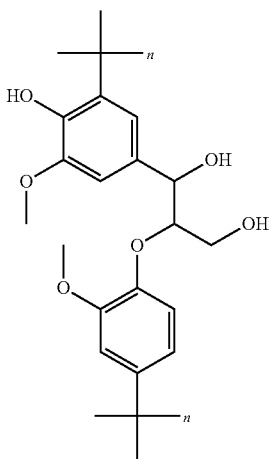 [SMILES: COc1cc(C(C)(C)C)ccc1OC(CO)C(O)c1cc(OC)c(O)c(C(C)(C)C)c1]

(C) Representative structure of depolymerized lignin.

The number of acetoacetoxy groups introduced into the lignin may be varied. The lignin may be fully acetoacetylated, where substantially all of the hydroxyl groups have been replaced with acetoacetoxy groups, or it may be partially acetoacetylated, where only a fraction of the available hydroxyl groups has been replaced with acetoacetoxy groups. It is understood in the art that some residual hydroxyl groups may remain, even when full acetoacetylation is desired. In some applications, as discussed below, residual hydroxyl groups may provide benefits to the resin. When substantially all of the hydroxyl groups are converted to acetoacetoxy groups, this correspond to a 1:1 ratio of hydroxyl groups to acetoacetoxy groups and where a portion of the acetoacetoxy groups is converted the ratio is less than 1:1. One embodiment of the invention is an acetoxylated lignin ester where only a portion of the hydroxyl groups of the polyol are replaced by acetoacetoxy groups. Different lignins from different sources and processes contain different compositions and differing amounts of hydroxyl groups. In addition, lignins contain different types of hydroxyl groups: primary aliphatic, secondary aliphatic, and aromatic. These hydroxyl groups may have different reactivity toward acetoacetylation. As an example, an analysis of Indulin AT indicated that approximately 26% of the hydroxyl groups were primary aliphatic, 17% were secondary aliphatic, and 57% were phenolic. See Cateto et al., J. Applied Polymer Science, 109:3008-3017 (2008). Reaction conditions could be such that only the primary aliphatic hydroxyl groups are acetoacetylated, leading to 26% of the hydroxyl groups being acetoacetylated, both the primary and secondary aliphatic hydroxyl groups could be acetoacetylated, leading to 43% of the hydroxyl groups being acetoacetylated, or all of the hydroxyl groups could be acetoacetylated. It is preferred to have at least 25%, more preferably at least 35%, even more preferable at least 40%, and even more preferable at least 45% of the hydroxyl groups acetoacetylated to provide sufficient a number of functional groups for crosslinking. It is also possible that even higher amounts are satisfactory.

The invention also relates to acetoacetylated lignin resins prepared in the presence of a polyol as the solvent. Reaction 2 below shows this embodiment, where the group R represents the internal structure of a terminal diol as a representative polyol.

Reaction 2

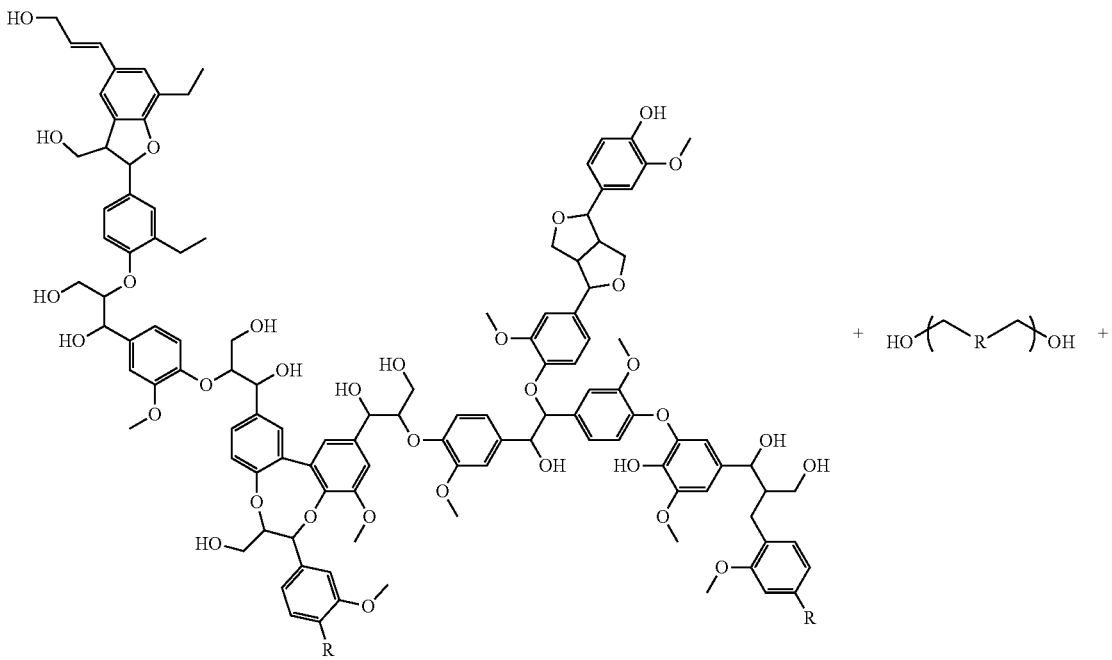

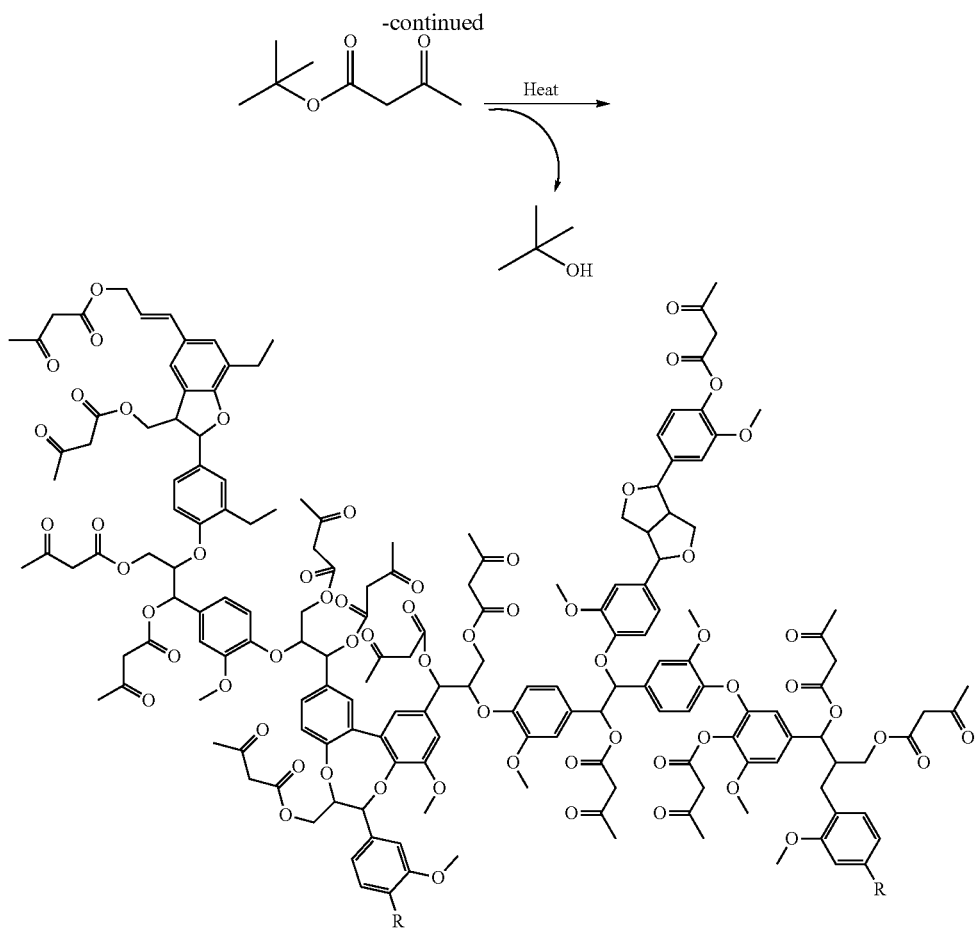

Kraft lignin is soluble in polyols. A homogeneous mixture of lignin in polyol can be prepared and the mixture readily acetoacetylated. During the acetoacetylation reaction, both the hydroxyl groups on the lignin as well as the hydroxyl groups on the polyol will be acetoacetylated. The resulting product mixture is completely reactive, does not contain volatile solvents, and can be used to prepare thermoset (crosslinked) materials. The acetoacetylated polyol remaining in the product mixture acts as a reactive diluent in the crosslinking of AAKL resins. A further advantage of this process is that a solvent is not used to solubilize the lignin that would have to be removed after the reaction is completed, thus, this process does not generate any waste.

Diols may be used as a polyol and include, but are not limited to, $C_2$-$C_{10}$ alkyl diols and $C_2$-$C_{10}$ alkylether diols. For example, exemplary diols that may be used in the invention include, but are not limited to, diethylene glycol (DEG), 2-butyl-2-ethyl-1,3-propane diol (BEPD), ethylene glycol, 1,2-propane diol, 1,3-propane diol, 2-methyl-1,3-propane diol, 1,4-butanediol, 2,3-butanediol, 1,5-pentanediol, 1,6-hexanediol, 1,4-cyclohexanedimethanol, neopentyl glycol (NPG), 2-butyl, 2-ethyl-1,3-propanediol (BEPD), and mixtures thereof.

The polyol may also be a triol compound that includes, but is not limited to, $C_3$-$C_{10}$ alkyl triols. Exemplary triols that may be used in the invention include, but are not limited to, trimethylolpropane (TMP), trimethylol ethane (TME), glycerol, and mixtures thereof. Triols may be added to introduce some branched oligomers. Mixtures of triols may be used as well as mixtures of diols and triols as the polyol component.

The acetoacetylated lignins of the invention may be used to prepare resins useable with multiple crosslinking chemistries for coatings, composites, and adhesives. Acetoacetylated lignin can be crosslinked by reaction with multifunctional amines, melamine-formaldehyde resins, and Michael reaction acceptors such as acrylic acid or methacrylic acid esters.

Just as with the acetoacetylated lignins described above, (meth)acrylated resins synthesized based on lignin may be prepared and are resins of the invention. These (meth) acrylated resins also are low cost bio-based thermosetting resins. Because Kraft lignin (representative structures shown above) has such an abundance of hydroxyl groups, both aromatic and aliphatic, it can easily be functionalized with (meth)acrylate groups (representative structure shown below). (Meth)acrylate is used to represent either an acrylate group or a methacrylate group, or mixtures thereof. The number of (meth)acrylate groups introduced into the lignin may be varied. The lignin may be fully (meth)acrylated, where substantially all of the hydroxyl groups have been replaced with (meth)acrylate groups, or it may be partially (meth)acrylated, where only a fraction of the available hydroxyl groups has been replaced with (meth)acrylate groups. It is understood in the art that some residual hydroxyl groups may remain, even when full (meth)acrylation is desired. In some applications, as discussed below, residual hydroxyl groups may provide benefits to the resin. When substantially all of the hydroxyl groups are converted to (meth)acrylate groups, this correspond to a 1:1 ratio of hydroxyl groups to (meth)acrylate groups and where a portion of the (meth)acrylate groups is converted the ratio is less than 1:1. One embodiment of the invention is an (meth)acrylated lignin ester where only a portion of the hydroxyl groups of the polyol are replaced by (meth)acrylate groups. For example, 50%, 60%, 70%, 80%, 90%, or 100% of the hydroxyl groups of lignin may be replaced by (meth)acrylate groups.

As discussed above, lignin is soluble in polyols and so a convenient method to functionalize lignin is to dissolve it in one or more polyols and then functionalize the lignin-polyol mixture. Since the chemistry used for functionalization reacts with the hydroxyl groups on the lignin as well as the hydroxyl groups on the polyol, the product is a mixture of functionalized lignin and functionalized polyol. See Reaction 3, shown below. Since everything in the mixture carries a functional group, the entire mixture may be used as is, with the functionalized polyol acting as a reactive diluent. In addition, the final product is a liquid, which allows for easy handling.

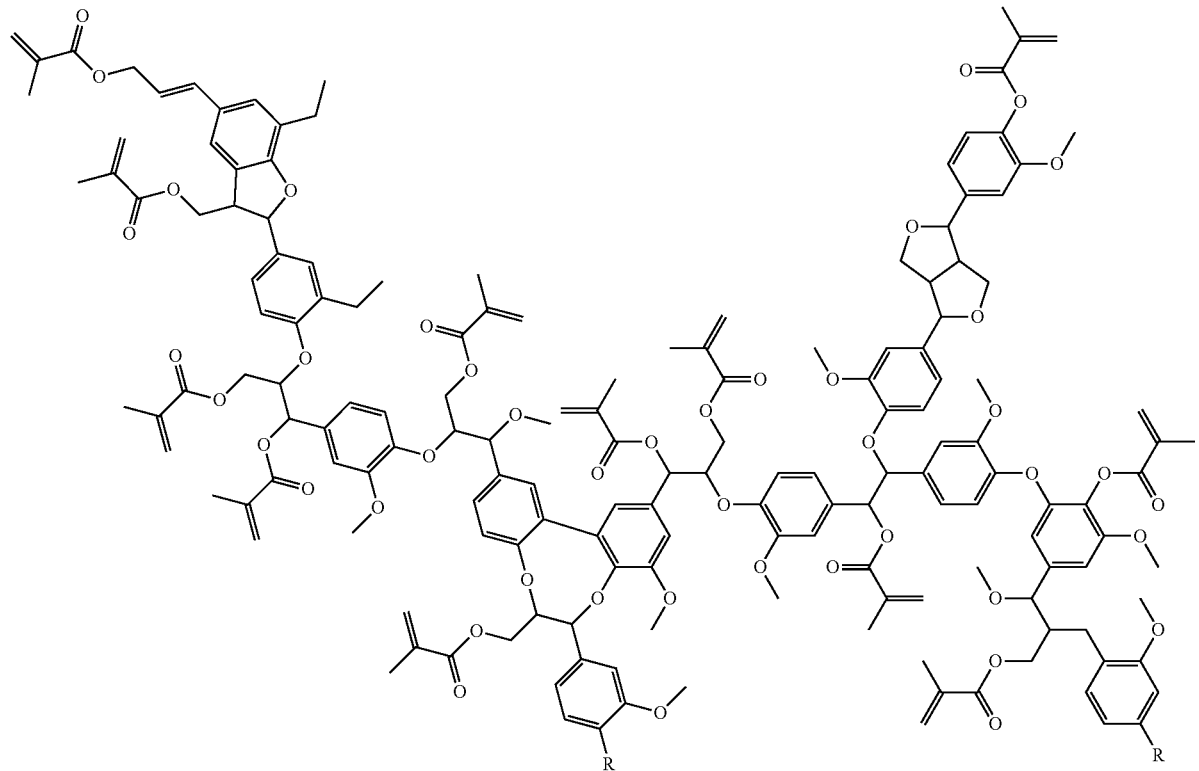

(D) Representative structure of Kraft lignin functionalized with methacrylate groups.

The invention also relates to (meth)acrylate functional resins derived from Kraft lignin using a novel resin synthesis technique. Kraft lignin is first solubilized in a polyol before being functionalized. Methacrylic anhydride, for example, can be used as the source of methacrylate functionality (Reaction 3). Resin synthesis yields a low viscosity resin that is successfully crosslinked using, for example, benzoyl peroxide as a free radical initiator.

Reaction 3: Resin synthesis used to create methacrylate functionalized Kraft Lignin resins.

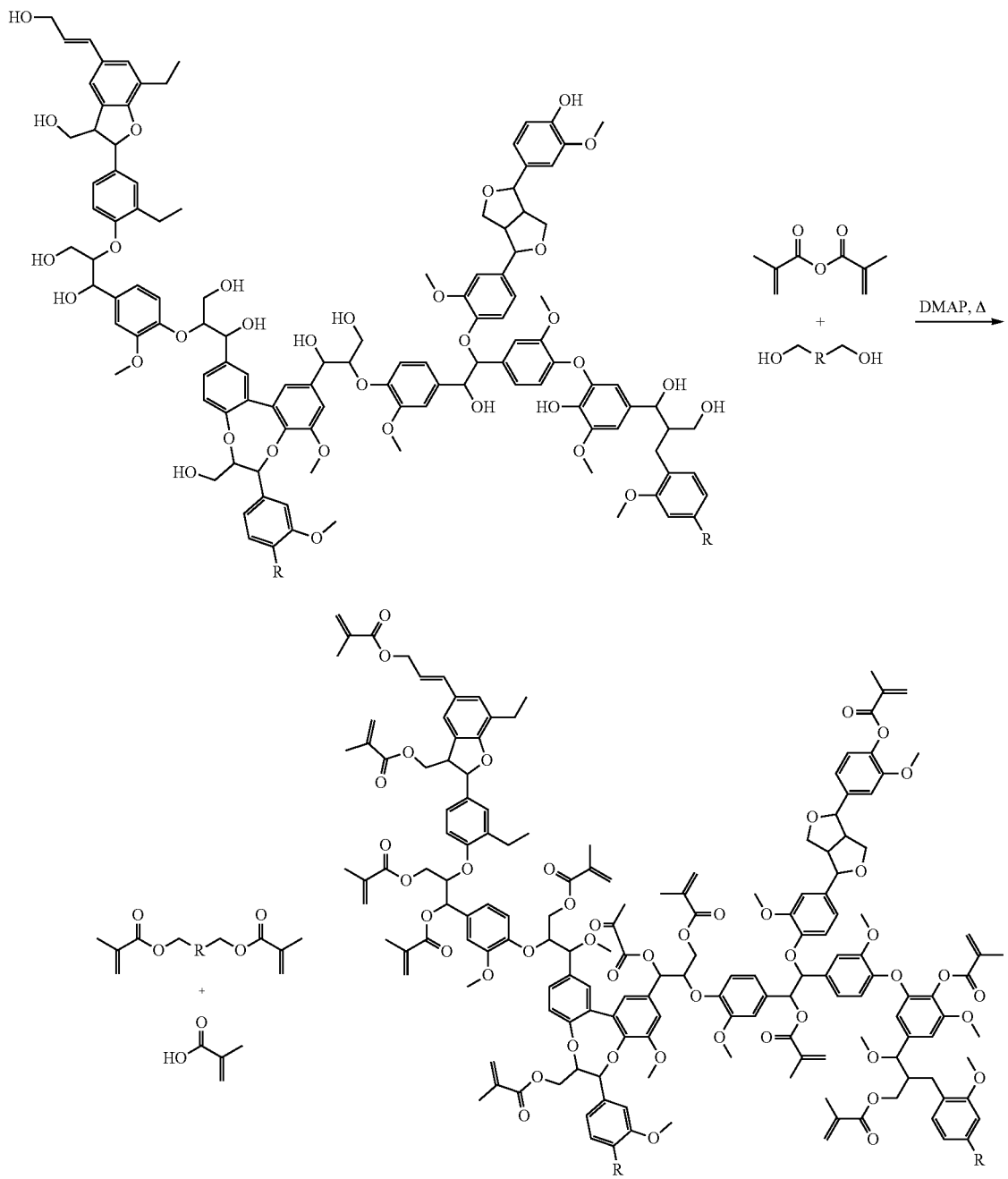

Thermoset materials from this invention, while having excellent properties such as toughness and stiffness, often have defects such as pinholes and bubbles that hinder quantitative assessment of material properties. This is likely due to the presence of the unreacted methacrylic acid, which is the byproduct of the methacrylation reaction. Under curing conditions, the methacrylic acid can volatilize and form a gas. To solve this problem, utilizing the remaining reactive material, methacrylic acid, the resin can be further modified by reacting the methacrylic acid to incorporate some materials that would help to plasticize the cured materials and reduce the amount of methacrylic acid in the resin system.

To remedy the defects in the cured methacrylated materials, the methacrylated resin may be further modified with, for example, at least one monofunctional epoxy compound. An example of a monofunctional epoxide is Cardura E-10P (Glycidyl Ester of Versatic Acid). The residual methacrylic acid in the resin reacts with the Cardura E-10P with, for example, benzyl trimethyl ammonium chloride (BTMAC) catalyst to yield a methacrylate modified Versatic Acid (Reaction 4). The long aliphatic chains of the Versatic acid help to plasticize the cured materials yielding a cured thermoset with fewer defects.

Reaction 4: Reaction of methacrylic acid with Cardura E-10P. R groups on Cardura molecule are, for example, alkyl chains.

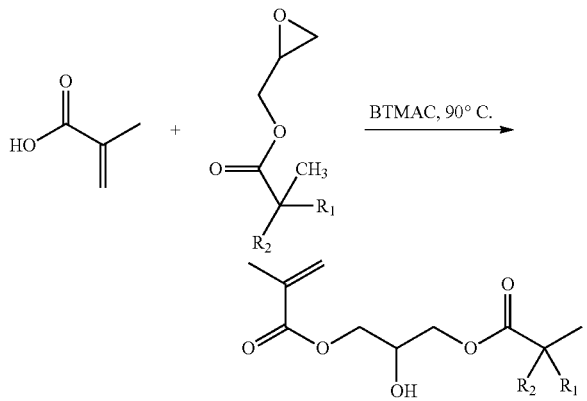

Any monofunctional epoxy compound can be reacted with the methacrylic acid including, for example, ethylene oxide, propylene oxide, butylene oxide, butyl glycidyl ether, cresyl glycidyl ether, etc.

The resins of this invention are useful in various applications such as in coatings, composites, and adhesives. Accordingly, the invention also relates to curable coating compositions, which may be formulated with or without solvents. A coating composition may be a solvent-free coating composition or may optionally contain a solvent such as, for example, acetone, THF, methyl ethyl ketone (MEK), xylene, etc. The coating composition may be a solution in such a solvent or mixture of solvents.

The acetoacetylated resins and (meth)acrylated resins may be cured using amine curing agents. Suitable amine curing agents are those that are soluble or at least dispersible in a coating composition of the invention. Amine curing agents known in the art include, for example, diethylenetriamine; triethylenetetramine; tetraethylene-pentamine; etc. as well as 2,2,4- and/or 2,4,4-trimethylhexamethylenediamine; 1,2- and 1,3-diaminopropane; 2,2-dimethylpropylenediamine; 1,4-diaminobutane; 1,6-hexanediamine; 1,7-diaminoheptane; 1,8-diaminooctane; 1,9-diaminononane; 1,12-diaminododecane; 4-azaheptamethylenediamine; N,N"-bis(3-aminopropyl)butane-1,4-diamine; 1-ethyl-1,3-propanediamine; 2,2(4),4-trimethyl-1,6-hexanediamine; N,N-bis(3-aminopropyl)ethylenediamine; 2,4(6)-toluenediamine; tetraethylenepentamine; 3-diethylaminopropylamine; 3,3"-iminobispropylamine; tetraethylenepentamine; 3-diethylaminopropylamine; and 2,2,4- and 2,4,4-trimethylhexamethylenediamine. Exemplary cycloaliphatic amine curing agents include, but are not limited to, 1,2- and 1,3-diaminocyclohexane; 1,4-diamino-2,5-diethylcyclohexane; 1,4-diamino-3,6-diethylcyclohexane; 1,2-diamino-4-ethylcyclohexane; 1,4-diamino-2,5-diethylcyclo-hexane; 1,2-diamino-4-cyclohexylcyclohexane; isophorone-diamine; norbornanediamine; 4,4'-diaminodicyclohexylmethane; 4,4'-diaminodicyclohexylethane; 4,4'-diaminodicyclohexylpropane; 2,2-bis(4-aminocyclohexyl)propane; 3,3'-dimethyl-4,4'-diaminodicyclohexylmethane; 3-amino-1-(4-aminocyclohexyl)propane; 1,3- and 1,4-bis(aminomethyl)cyclohexane; and 1-cyclohexyl-3,4-dimino-cyclohexane. As exemplary araliphatic amines, in particular those amines in which the amino groups are present on the aliphatic radical, include, for example, m- and p-xylylenediamine and its hydrogenation products as well as diamide diphenylmethane; diamide diphenylsulfonic acid (amine adduct); 4,4"-methylenedianiline; 2,4-bis (p-aminobenzyl)aniline; diethyltoluenediamine; and m-phenylene diamine. The amine curing agents may be used alone or as mixtures.

Suitable amine-epoxide adducts include, for example, reaction products of diamines, such as ethylenediamine, diethylenetriamine, triethylenetetramine, m-xylylenediamine, and/or bis(aminomethyl)cyclohexane with terminal epoxides, such as the polyglycidyl ethers of the polyhydric phenols listed above.

Polyamide resins can also serve as curing agents for the resins. Suitable polyamide resins include those prepared through the reaction product of multifunctional amines with diacids. Dimer fatty acids are the most commonly used diacids for the synthesis of polyamide resins.

A preferred amine curing agent used with the coating compositions of the invention is PACM (bis(para-aminocyclohexyl)methane).

The acetoacetylated resins may also be cured using aminoplast resins such as melamine formaldehyde or urea formaldehyde resins. A catalyst such as p-toluene sulfonic acid may be used.

The acetoacetylated resins may also be cured using a Michael addition reaction with Michael acceptors such as multifunctional acrylates, methacrylates, or crotonates. Suitable multifunctional (meth)acrylates include, for example, bisphenol A diglycidylether methacrylate (Bis-GMA), ethylene glycol dimethacrylate, 1,4-butanediol dimethacrylate, polyethylene glycol dimethacrylate, trimethylolpropane trimethacrylate, triethyleneglycol dimethacrylate (TEGDMA), 1,6-hexanediol diacrylate, trimethylolpropane triacrylate, pentaerythritol tetraacrylate, ethoxylated trimethylolpropane triacrylate, and acrylated epoxidized soybean oil. (Meth)acrylated resins of the present invention can also be used as Michael addition curing agents with the acetoacetylated resins. The Michael addition reaction is catalyzed by a strong base such as sodium hydroxide, potassium hydroxide, 1,8-diazabicyclo[5.4.0]undec-7-ene (DBU), 1,5-diazabicyclo[4.3.0]non-4-ene (DBN), triazabicyclodecene (TBD), and the like.

The (meth)acrylated resins of the invention can be used in various compositions, such as coatings, composites, adhesives, etc. that are cured using a free radical process. Initiators that may be used to cure the (meth)acrylated resins of the invention include, but are not limited to, Luperox-P and Luperox 10M75. The invention also relates to curable coating compositions comprising the (meth)acrylated resins, which may be formulated with or without solvents. A coating composition may be a solvent-free coating composition or may optionally contain a solvent such as, for example, acetone, THF, methyl ethyl ketone (MEK), xylene, etc. The coating composition may be a solution in such a solvent or mixture of solvents.

The invention also relates to a curable coating composition comprising at least one (meth)acrylated resin, at least one optional diluent, and at least one optional initiator. The curable coating compositions may be made by mixing at least one (meth)acrylated resin with at least one optional diluent and at least one optional initiator. The invention further relates to thermoset coatings formed from the curable coating compositions of the invention.

The invention also involves the free radical curing of the (meth)acrylated resins and coating compositions containing these oligomers. Formulations may be prepared by mixing the oligomer resin with an optional diluent, an optional solvent, and an initiator.

When a coating composition contains a polyfunctional bio-based oligomer, the diluents may be ones used in free radical or vinyl polymerizations such as, but not limited to, styrene, bisphenol A diglycidylether methacrylate (Bis-GMA), ethylene glycol dimethacrylate, 1,4-butanediol dimethacrylate, polyethylene glycol dimethacrylate, trimethylolpropane trimethacrylate, triethyleneglycol dimethacrylate (TEGDMA), isodecyl acrylate, 2-hydroxyethyl acrylate, butyl acrylate, 2-ethylhexyl acrylate, 1,6-hexanediol diacrylate, trimethylolpropane triacrylate, pentaerythritol tetraacrylate, ethoxylated trimethylolpropane triacrylate, and acrylated epoxidized soybean oil.

For free radical thermal curing, a thermally initiated free radical initiator is needed. Suitable thermally initiated free radical initiators include dialkyl peroxides, such as, for example, dicumyl peroxide, di-t-butyl peroxide, di-t-amyl peroxide, alpha, alpha' di(t-butyl peroxy diisopropyl benzenes, 2,5-dimethyl-2,5-di-(t-butyl peroxy) hexane, 2,5-dimethyl-2,5-di-(t-butyl peroxy) hexyne-3, t-butyl cumyl peroxide; diacyl peroxides, such as, for example, dibenzoyl peroxide, succinic acid peroxide, dilauryl peroxide, didecanoyl peroxide; diperoxyketals, such as, for example, 1,1-di(t-butylperoxy)-3,3,5-tri methylcyclohexane, 1,1-di(t-butylperoxy)-cyclohexane, 1,1-di(t-amylperoxy)cyclohexane, n-butyl-4,4-di(t-butylperoxy)valerate, ethyl-3,3-di(t-amylperoxy)butyrate, ethyl-3,3-di(t-butylperoxy) butyrate; hydroperoxides, such as, for example, cumene hydroperoxide, diisopropylbenzene hydroperoxide, t-butyl hydroperoxide, t-amyl hydroperoxide; ketone peroxides, such as, for example, methyl ethyl ketone peroxide, 2,4-pentanedione peroxide; peroxydicarbonates, such as, for example, di(n-propyl) peroxydicarbonate, di(sec-butyl) peroxydicarbonate, di(2-ethylhexyl) peroxydicarbonate; peroxyesters, such as, for example, alpha-cumyl peroxy neodecanoate, t-amyl peroxy neodecanoate, t-butyl peroxy neodecanoate, t-amyl peroxypivalate, t-butyl peroxypivalate, 2,5-di(2-ethylhexanoylperoxy) 2,5-dimethylhexane, t-amyl peroxy 2-ethylhexanoate, t-butyl peroxy-2-ethylhexanoate, t-amyl peroxyacetate, t-butyl peroxyacetate, t-butyl peroxybenzoate, OO-(t-amyl) O-(2-ethylhexyl) monoperoxycarbonate, OO-(t-butyl) O-isopropyl monoperoxycarbonate, OO-(t-butyl) O-(2-ethylhexyl) monoperoxycarbonate, poly-t-butylperoxy carbonate; azo initiators, such, for example, as 2,2'-azobis (2,4-dimethyl-pentanenitrile), 2,2'-azobis-(2-isobutyronitrile), 2,2'-azobis(2-methylbutyronitrile), 1,1'-azodicyclohexanecarbonitrile; and the like. Mixtures of initiators can be used.

When a composition containing a (meth)acrylated resins is thermally cured, the composition may further comprise a diluent selected from, for example, styrene, bisphenol A diglycidylether methacrylate (Bis-GMA), triethyleneglycol dimethacrylate (TEGDMA), isodecyl acrylate, isodecyl methacrylate, 2-hydroxyethyl acrylate, 2-hydroxyethyl methacrylate, butyl acrylate, butyl methacrylate, 2-ethylhexyl acrylate, 2-ethylhexyl methacrylate, 1,6-hexanediol diacrylate, 1,6-hexanediol dimethacrylate, trimethylolpropane triacrylate, trimethylolpropane trimethacrylate, pentaerythritol tetraacrylate, pentaerythritol tetramethacrylate, ethoxylated trimethylolpropane triacrylate, ethoxylated trimethylolpropane trimethacrylate, acrylated epoxidized linseed oil, methacrylated epoxidized linseed oil, acrylated epoxidized soybean oil, and methacrylated epoxidized soybean oil.

The invention also relates to the use of a coating composition that may be coated onto a substrate and cured using techniques known in the art. The substrate can be any common substrate such as paper, polyester films such as polyethylene and polypropylene, metals such as aluminum and steel, glass, urethane elastomers, primed (painted) substrates, and the like. The coating composition of the invention may be cured at room temperature (ambient cure) or at elevated temperatures (thermal cure), or may be cured photochemically. The invention also relates to an article of manufacture comprising a thermoset coating composition of the invention.

A coating composition of the invention may further contain coating additives. Examples of such coating additives include, but are not limited to, one or more leveling, rheology, and flow control agents such as silicones, fluorocarbons, or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148, which is incorporated herein by reference.

EXAMPLES

Fourier Transformed Infrared Spectroscopy (FTIR) was performed using a Thermo Nicolet 8700 FTIR spectrometer. Spectra acquisitions were based on 32 scans with data spacing of 1.928 cm$^{-1}$ in the range of 4000-500 cm$^{-1}$. Molecular weight was determined by Gel Permeation Chromatography (GPC) using a GPC system (EcoSEC HLC-8320GPC, Tosoh Bioscience, Japan) with a differential refractometer detector. Separations were performed with two TSKgel SuperH3000 6.00 mm ID×15 cm columns with an eluent flow rate of 0.35 ml min$^{-1}$. The columns and detectors were thermostated at 40° C. Tetrahydrofuran was used as the eluent. Samples were prepared by dissolving 1 mg ml$^{-1}$ in the eluent (THF) and dissolved at ambient temperature for several hours. The injected volume was 20 µL for each sample. The system was calibrated using a PS standard (Aligent EasiVial PS-H 4 ml).

Viscosity measurements were done using a TA Instruments ARES rheometer. Viscosity measurements were made at a frequency of 100 Hz using parallel plate geometry.

Example 1

Partial Depolymerization of Kraft Lignin

The partial depolymerization of Kraft Lignin (Indulin AT product obtained from Mead Westvaco) was done in a 500 ml Parr reactor. Kraft Lignin (20 g), sodium hydroxide (10 g), and methanol (250 ml) were combined in the reaction vessel. The vessel was tightened and purged with hydrogen gas. Once purging was complete, the reaction vessel was filled with hydrogen gas (1200 psi) and began heating to 250° C. An overhead stirrer was used to mix the reactants. The reaction was run for 90 minutes once temperature reached 250° C. After 90 minutes the reaction mixture was placed in jars for later work up. Scheme 1, below, shows the reaction conditions used for the partial depolymerization of Kraft lignin.

Scheme 1

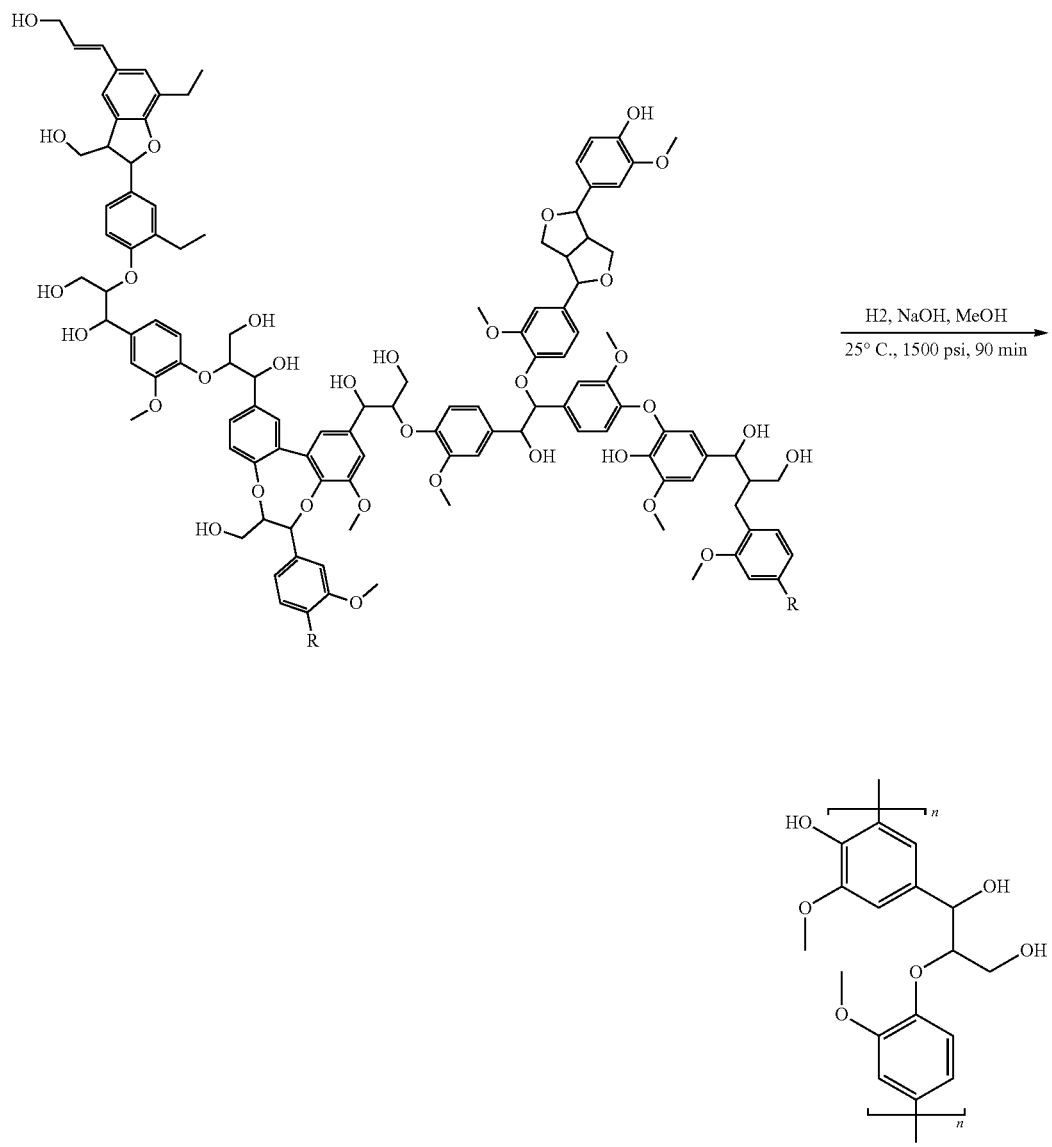

To work up partially depolymerized lignin, the reaction mixture first was neutralized using 37% hydrochloric acid solution. The solution's pH was monitored using a pH meter. Next, the neutralized reaction mixture was filtered using vacuum filtration and then washed with additional methanol to further extract the partially depolymerized Kraft lignin. The methanol filtrate was placed in a round bottom and the methanol was removed using a rotary evaporator. The remaining material, after removal of methanol, was then extracted using acetone. The acetone was then vacuum filtered to remove any remaining high molecular weight material. Acetone was then removed using a rotary evaporator and the remaining material was used as partially depolymerized Kraft lignin (PDL). The color of the PDL was a dark brown color and ranged from liquid to solid. Table 1 reports the results of the depolymerization reactions 1-1 through 1-8 to form PDL and their yield.

TABLE 1

Depolymerization Reactions.

Depolymerization of Kraft Lignin

| Reaction | Kraft Lignin (g) | NaOH (g) | Methanol (ml) | Amount of PDL | % Yield |
|---|---|---|---|---|---|
| 1-1 | 20 g | 10 g | 250 ml | 0.99 g | 4.95 |
| 1-2 | 20 g | 10 g | 250 ml | NA | 0.00 |
| 1-3 | 20 g | 10 g | 250 ml | NA | 0.00 |
| 1-4 | 20 g | 10 g | 250 ml | 1.05 g | 5.25 |
| 1-5 | 20 g | 10 g | 250 ml | 0.22 g | 1.10 |
| 1-6 | 20 g | 10 g | 250 ml | 3.16 g | 15.80 |
| 1-7 | 20 g | 10 g | 250 ml | 4.61 g | 23.05 |
| 1-8 | 20 g | 10 g | 250 ml | 0.49 g | 2.45 |

As shown in Table 1, some depolymerization reactions were able to yield a partially depolymerized version of Kraft Lignin, however the reaction yields were generally very low. Fourier Transformed Infrared Spectroscopy (FTIR) was performed on each of the samples that yielded PDL. The FTIR spectra showed inconsistencies in the spectra, especially in the C=C stretching region, as well as the C-H stretching region. See FIGS. 1a-d, for reactions 1-1, 1-3, 1-4, and 1-6. The hydroxyl groups can easily be seen in the FTIR spectra. The molecular weight of the PDL was determined by Gel Permeation Chromatography (GPC). Table 2 shows the results.

TABLE 2

Molecular weight analysis of the partially depolymerized Kraft lignin.

| Reaction | Number Average MW | Weight Average MW | Polydispersity index |
|---|---|---|---|
| 1-1 | 538 | 1503 | 2.8 |
| 1-4 | 275 | 382 | 1.4 |
| 1-5 | 352 | 431 | 1.2 |
| 1-6 | 288 | 425 | 1.5 |
| 1-7 | 342 | 569 | 1.7 |

Example 2

Acetoacetylation of Kraft Lignin

Kraft Lignin and tert-butyl acetoacetate were reacted together under a variety of reaction conditions. Reactions in solvent and heat as well as with and without catalyst were all attempted. The use of an optional acid catalyst is known to possibly increase the rate of acetoacetylation. Scheme 2 shows the general reaction.

Scheme 2: Acetoacetylation of Kraft lignin.

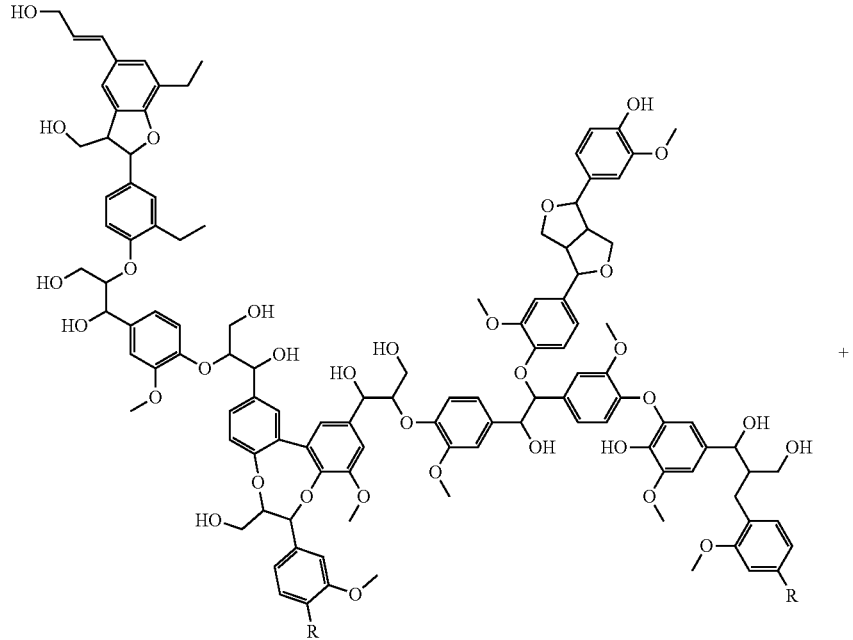

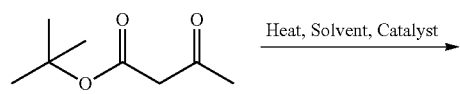

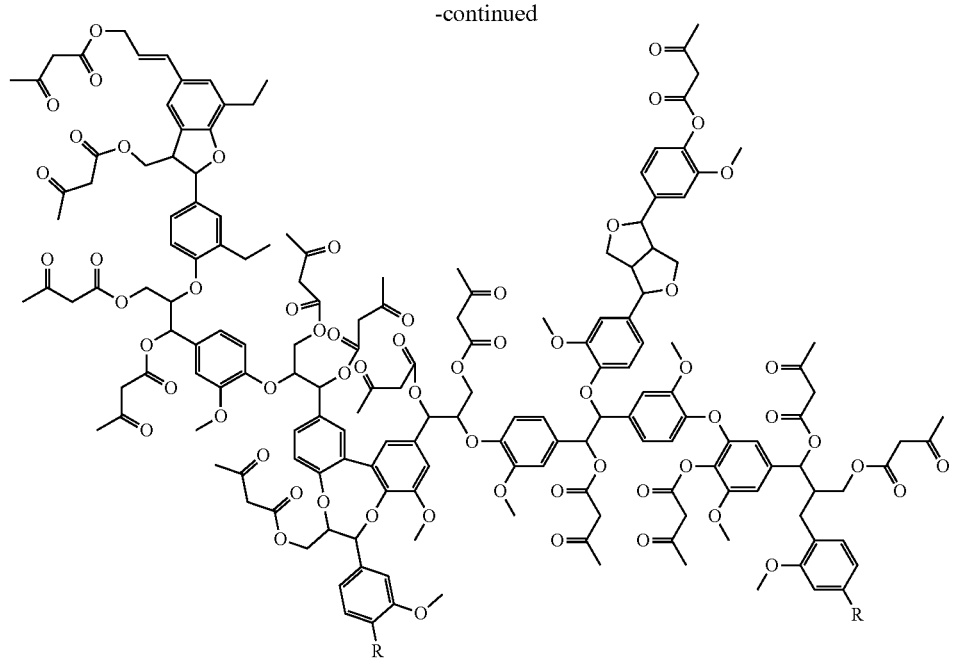

For each reaction an amount of Kraft lignin and tert-butyl acetoacetate (tBAA) were measured out into the reaction flask. Solvents used in the reactions were varied as indicated below. The solvents used in the acetoacetylation reactions varied between ethyl 3-ethoxypropionate, water, tetrahydrofuran, pyridine, and 1,4 dioxane. Hydrochloric acid was used in catalytic amounts in select reactions. All reaction mixtures were dried using a rotary evaporator to remove any excess solvent and unreacted tBAA. Table 3 below summarizes all of the reactions of the direct acetoacetylation of Kraft Lignin.

TABLE 3

Reaction Conditions for Acetoacetylation of Kraft lignin.
Direct functionalization of Kraft Lignin

| Reaction | Kraft Lignin (g) | tBAA (g) | Solvent | Amount of Solvent (ml) | HCl Catalyst | Temp. (° C.) | Time (hr) |
|---|---|---|---|---|---|---|---|
| 2-1 | 10 g | 11.86 g | EEP | 100 ml | * | 140° C. | 48 |
| 2-2 | 10 g | 9.9 g | EEP | 100 ml | * | 140° C. | 24 |
| 2-3 | 8.2 g | 95.4 g | * | * | * | 140° C. | 48 |
| 2-4 | 1 g | 1.3 g | H$_2$O | 100 ml | * | 130° C. | 3 |
| 2-5 | 10 g | 11.86 g | H$_2$O | 100 ml | 1 ml | 95° C. | 2 |
| 2-6 | 10 g | 11.86 g | 1,4 Dioxane | 100 ml | * | 90° C. | 48 |
| 2-7 | 10 g | 11.86 g | H$_2$O/Dioxane | 50 ml/50 ml | 1 ml | 90° C. | 47 |
| 2-8 | 10 g | 11.86 g | H$_2$O | 100 ml | 1 ml | 90° C. | 45 |
| 2-9 | 10 g | 11.86 g | H$_2$O | 100 ml | 1 ml | 90° C. | 4 |
| 2-10 | 10 g | 11.86 g | H$_2$O | 100 ml | 1 ml | 85° C. | 24 |
| 2-11 | 10 g | 11.86 g | H$_2$O | 100 ml | 1 ml | 80° C. | 24 |
| 2-12 | 10 g | 11.86 g | H$_2$O/Dioxane | 50 ml/50 ml | 1 ml | 80° C. | 24 |
| 2-13 | 10 g | 11.86 g | 1,4 Dioxane | 100 ml | * | 100° C. | 24 |
| 2-14 | 8.2 g | 97 g | * | * | * | 120° C. | 95 |
| 2-15 | 8.2 g | 97 g | * | * | * | 130° C. | 144 |
| 2-16 | 10 g | 11.86 g | H$_2$O | 100 ml | * | 90° C. | 24 |
| 2-17 | 10 g | 11.86 g | 1,4 Dioxane | 100 ml | * | 90° C. | 25 |
| 2-18 | 10 g | 11.86 g | Pyridine | 100 ml | * | 90° C. | 25 |
| 2-19 | 10 g | 11.86 g | THF | 100 ml | * | 55° C. | 24 |
| 2-20 | 10 g | 11.86 g | H$_2$O | 100 ml | * | 90° C. | 24 |
| 2-21 | 10 g | 11.86 g | H$_2$O | 100 ml | 0.2 ml | 90° C. | 24 |
| 2-22 | 10 g | 11.86 g | 1,4 Dioxane | 100 ml | 0.2 ml | 90° C. | 24 |
| 2-23 | 10 g | 11.86 g | Pyridine | 100 ml | 0.2 ml | 90° C. | 24 |
| 2-24 | 10 g | 11.86 g | THF | 100 ml | 0.2 ml | 55° C. | 25 |

Figure 2:
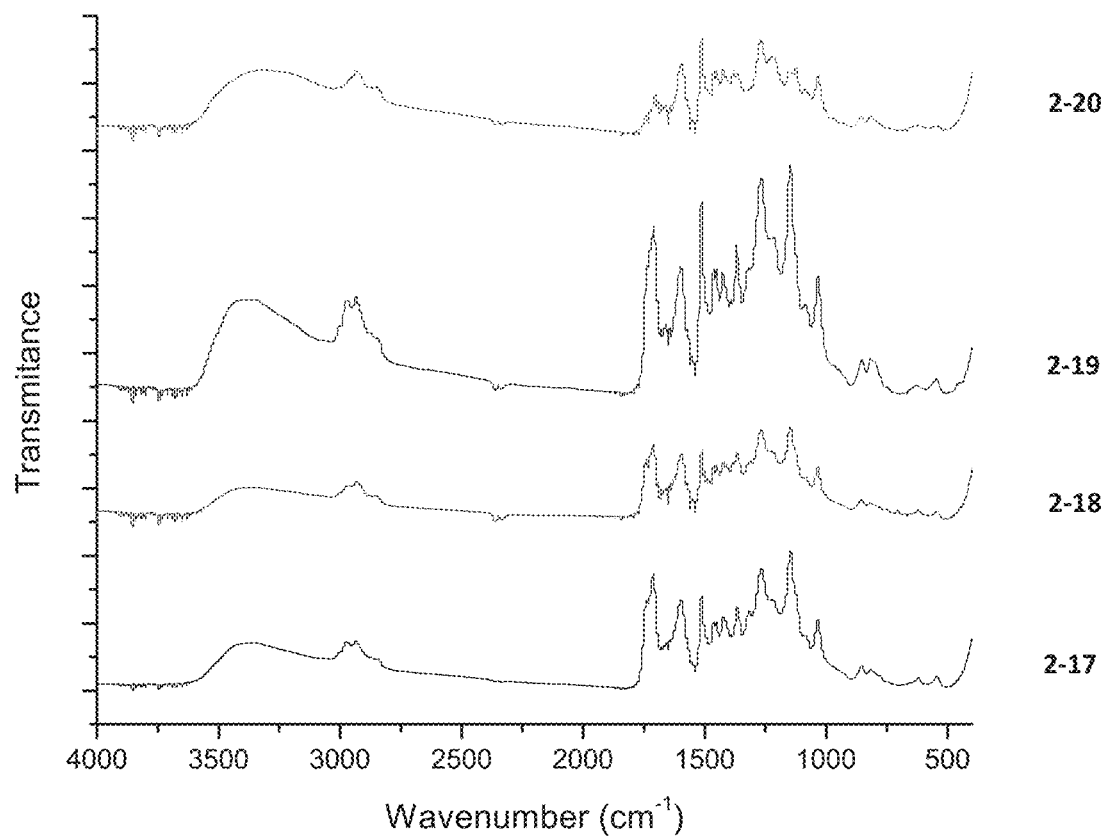
FIG. 2 shows the FTIR spectra of the acetoacetylation products described in Example 2 from reactions 2-20, 2-19, 2-18, and 2-17, top to bottom, respectively

As shown in Table 3, a variety of reactions were conducted to achieve an Acetoacetylated Kraft Lignin (AAKL) resin of the invention. FTIR analysis shows a band in the region of C=O stretching at 1700-1750 cm$^{-1}$. This suggests the presence of the ester group. See FIG. 2, which shows the FTIR spectra of the acetoacetylation products from reactions 2-20, 2-19, 2-18, and 2-17, top to bottom, respectively. Also observing a strong band in the hydroxyl region of these spectra, it is unclear if the resulting ester peak is coming from an AAKL or from unreacted tBAA.

The AAKL resins obtained from the direct acetoacetylation of Kraft lignin is a dark brown solid that has increased solubility in acetone when compared to unmodified Kraft lignin. To assess the crosslinking ability of AAKL, an AAKL was dissolved in acetone before adding a crosslinking agent. Initial tests with the following curing agents were done: ethylene diamine, an amine curing agent; Sartomer 259 (DBU catalyst, polyethylene glycol diacrylate curing agent used for Michael addition crosslinking), and Cymel 301 (pTSA catalyst, a fully alkylated melamine-formaldehyde curing agent). These initial tests suggested that all of these crosslinking mechanisms would successfully crosslink and cure an AAKL of the invention.

Example 3

Acetoacetylation of Kraft Lignin in Polyol Solvents

Using a 250 ml three neck round bottom flask, the three necks of the reaction flask were equipped with an overhead mechanical stirrer, a thermocouple and an outlet with a condenser and Erlenmeyer flask to collect tert-butanol byproduct. Kraft Lignin, polyol, and tert-butyl acetoacetate (tBAA) were measured into the reaction flask. Once the reactants were added the mechanical stirrer, thermocouple, and condensing arm were attached. The mixture was then stirred and heated (130° C.). Tert-butanol was collected in the Erlenmeyer flask attached to the condensing arm. Reactions were considered to be complete when the production of excess t-butanol had stopped and no bubbles were being produced inside the reaction flask. Once the reaction had reached completion, the resin was allowed to cool to room temperature before being characterized. Each resin was characterized by FTIR analysis and viscosity measurements on the ARES rheometer. A variety of polyols were used to synthesize the AAKLP resins: 1,4 butanediol (1,4 BD); diethylene glycol (DG); ethylene glycol (EG); and glycerol (G). The reaction conditions used are described in Table 4.

TABLE 4

Reaction Conditions for Acetoacetylation of Lignin in a Polyol.

| Reaction | Weight percentage of Kraft Lignin | Kraft Lignin (g) | Polyol | Weight Percentage of Polyol | Polyol (g) | tBAA (g) |
| --- | --- | --- | --- | --- | --- | --- |
| 3-1 | 9.1 | 2.5 g | 1,4 Butanediol | 90.9 | 25 g | 91.1 g |
| 3-2 | 0 | 0 g | 1,4 Butanediol | 100 | 25 g | 90.01 g |
| 3-3 | 16.67 | 5.09 g | 1,4 Butanediol | 83.33 | 25 g | 95.05 g |
| 3-4 | 23.07 | 7.51 g | 1,4 Butanediol | 76.93 | 25 g | 100 g |
| 3-5 | 30 | 10 | 1,4 Butanediol | 70 | 23.33 g | 100.6 g |
| 3-6 | 40 | 15 g | 1,4 Butanediol | 60 | 22.5 g | 103.2 g |
| 3-7 | 50 | 20 g | 1,4 Butanediol | 50 | 20 g | 98.9 g |
| 3-8 | 60 | 25 g | 1,4 Butanediol | 40 | 16.67 g | 91.67 g |
| 3-9 | 70 | 30 g | 1,4 Butanediol | 30 | 12.86 g | 82.35 g |
| 3-10 | 10 | 2.5 g | 1,4 Butanediol | 90 | 22.5 g | 89.62 g |
| 3-11 | 20 | 5 g | 1,4 Butanediol | 80 | 20 g | 82.58 g |
| 3-12 | 0 | 0 | Diethylene Glycol | 100 | 80 g | 238.52 g |
| 3-13 | 50 | 40 g | Diethylene Glycol | 50 | 40 g | 174.69 g |
| 3-14 | 80 | 20 g | 1,4 Butanediol | 20 | 5 g | 41.05 g |
| 3-15 | 0 | 0 | Ethylene Glycol | 100 | 25 g | 140.17 g |
| 3-16 | 40 | 16.67 g | Ethylene Glycol | 60 | 25 g | 158.3 g |
| 3-17 | 0 | 0 | Glycerol | 100 | 25 g | 141.72 g |
| 3-18 | 40 | 16.67 g | Glycerol | 60 | 25 g | 159.85 g |
| 3-19 | 40 | 16.67 g | Diethylene Glycol | 60 | 25 g | 91.01 g |

An FTIR spectra was taken for each of the resins and viscosity was measured at room temperature and 100 Hz FTIR. The FTIR spectra confirmed the expected structure of the resins.

Figure 3:
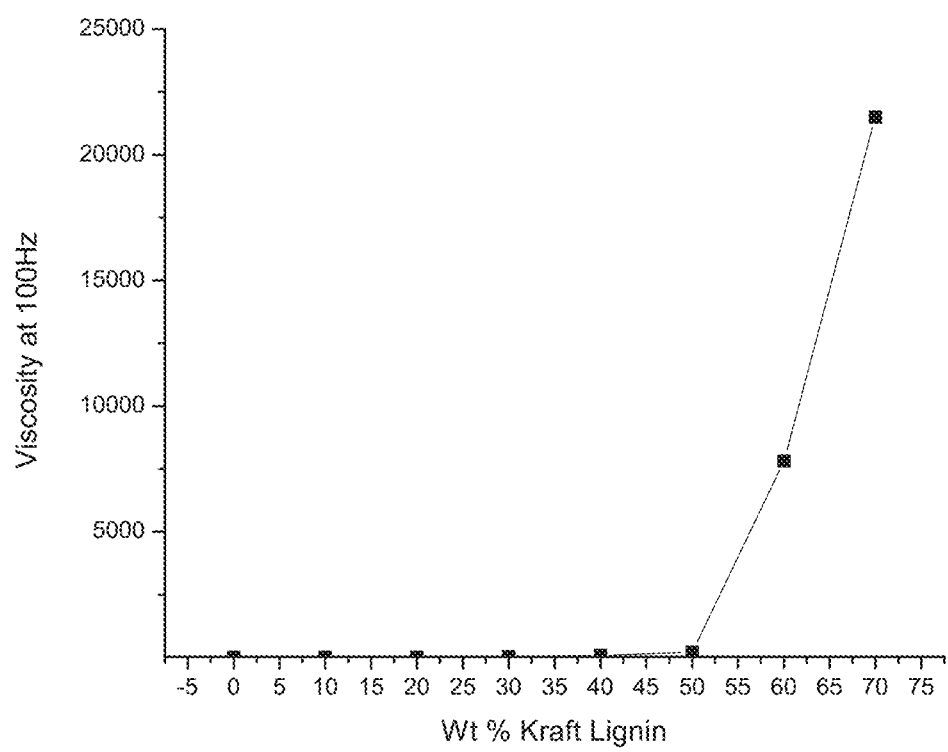
FIG. 3 is a graph comparing the weight percentage of Kraft Lignin in an acetoacetylated lignin resin prepared in 1,4-butaniediol (Example 3) to its viscosity at 100 Hz.
Figure 4:
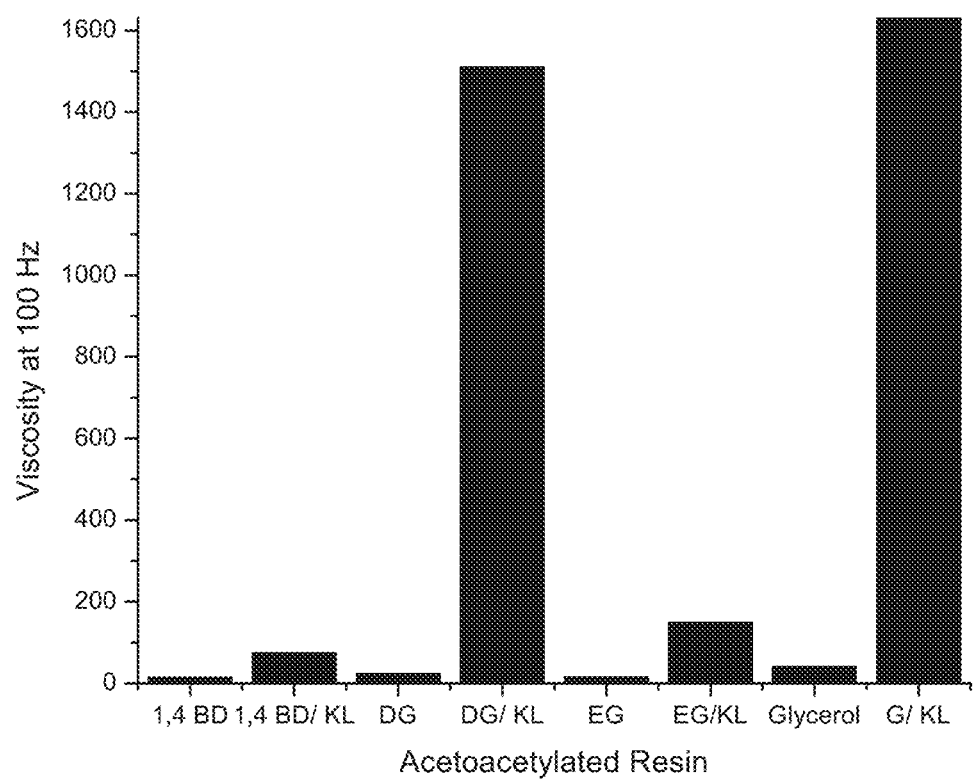
FIG. 4 shows the viscosity taken at 100 Hz. for acetoacetylated polyols and those polyols with 40 wt. % Kraft lignin in Example 3.

The viscosity of the resins prepared using 1,4-butanediol is reported in Table 5 and shown in FIG. 3. The resin viscosity was measured on the ARES rheometer at room temperature and 100 Hz. FIG. 3 is a graph of the weight percentage of Kraft Lignin in the resin compared to its viscosity at 100 Hz. FIG. 4 shows the viscosity taken at 100 Hz. for acetoacetylated polyols and those polyols with 40 wt. % Kraft Lignin (KL). There is a clear trend in the viscosity data that shows that increasing the weight percentage of Kraft Lignin will increase the viscosity of the system. It is clear that, by exceeding 50 weight percent of Kraft Lignin, the viscosity of the system increases drastically and continues to increase until the system become solid at 80% by weight Kraft Lignin. Varying the amount of Kraft Lignin in the resin permits control and optimization of resin properties and process conditions by balancing the amount of Kraft lignin in the resin and the resin viscosity.

TABLE 5

1,4 Butanediol/Kraft Lignin Resin Viscosity.
1,4 Butanediol/Kraft Lignin Resins.

| Wt % Kraft Lignin | Viscosity in centipoise |
|---|---|
| 0 | 13.9 |
| 10 | 12 |
| 20 | 15.4 |
| 30 | 33.1 |
| 40 | 74.2 |
| 50 | 216.9 |
| 60 | 7819.6 |
| 70 | 21489.3 |
| 80 | Solid, could not measure |

Coating compositions were prepared by curing AAKLP resins with Cymel 301 (available from Allnex). See Reaction 5, shown below. Cymel 301 is a fully alkylated melamine formaldehyde resin that uses para-toluenesulfonic acid (pTSA) as a catalyst. Catalyst was dissolved in an appropriate amount of methanol to create a 40% solution. Additionally, BYK 370 0.5%, a silicone surface additive available from BYK, was added to help the coating wet the steel substrate. The steel substrate was cleaned with isopropyl alcohol before the coatings were applied. All coatings were applied at a wet film thickness of 4 mils. Formulations with Cymel 301 were made at 20, 25, and 30% by weight, Cymel 301 with 0.05% catalyst, and 0.5% BYK 370. Coatings were cured at 130° C. for 10 minutes and 160° C. for 30 minutes. Coatings were allowed to rest for 24 hours before being tested.

Reaction 5: crosslinking reaction between a melamine and acetoacetate functional groups.

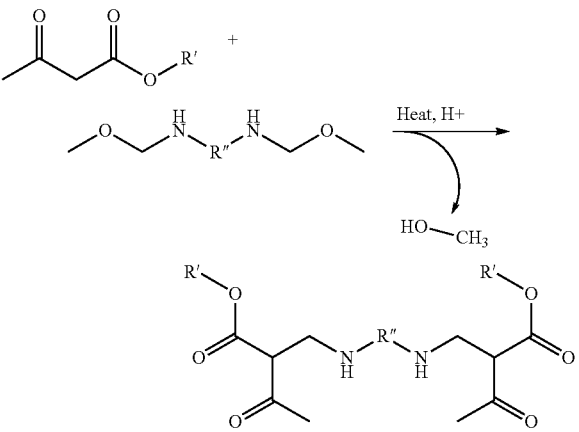

Coatings analysis was performed following the procedure outlined in the ASTM standards: Average Film Thickness, ASTM D6132-13; Konig Pendulum Hardness, ASTM D4366; Pencil Hardness, ASTM D3363; Crosshatch Adhesion, ASTM D3359-09; MEK Double Rubs, ASTM D5402; Reverse Impact, ASTM D6905; and Mandrel Bend ASTM D522/D522M-13. Table 6 shows the results.

TABLE 6

Acetoacetylated Kraft Lignin, 1,4 Butanediol Coatings Cured with Cymel 301.

| Coating | % MF | Wt. % Lignin | Avg. Film Thickness | Konig Pendulum Hardness | Pencil Hardness | Crosshatch Adhesion | MEK Double Rubs | Reverse Impact | Mandrel Bend |
|---|---|---|---|---|---|---|---|---|---|
| 3a | 20 | 0 | 9.1 | 60 | B | 5B | 142 | 12 in lbs. | 0 |
| 3b | 25 | 0 | 18.1 | 58.7 | H | 5B | 232 | 12 in lbs. | 0 |
| 3c | 30 | 0 | 18.5 | 111.3 | 2H | 5B | 400+ | 8 in lbs. | 0 |
| 3d | 20 | 10 | 8.7 | 134.3 | H | 5B | 289 | 8 in lbs. | 6 cm |
| 3e | 25 | 10 | 15.7 | 77.3 | H | 5B | 400+ | 8 in lbs. | 8 cm |
| 3f | 30 | 10 | 19.2 | 80.3 | 3H | 5B | 400+ | 12 in lbs. | 10.5 cm |
| 3g | 20 | 20 | 13.9 | 166 | 3H | 5B | 400+ | 8 in lbs. | 0 |
| 3h | 25 | 20 | 15.2 | 156.7 | 3H | 5B | 400+ | 8 in lbs. | 0 |
| 3i | 30 | 20 | 17.5 | 169.7 | 4H | 4B | 400+ | 8 in lbs. | 0 |
| 3j | 20 | 30 | 17.6 | 170 | HB | 1B | 130 | 8 in lbs. | 6.1 cm |
| 3k | 25 | 30 | 17.5 | 137 | 2H | 5B | 400+ | 8 in lbs. | 10 cm |
| 3l | 30 | 30 | 23.4 | 185 | H | 0B | 400+ | 32 in lbs. | 0 |
| 3m | 20 | 40 | 23.8 | 133.3 | H | 0B | 400+ | 4 in lbs. | 10.4 cm |
| 3n | 25 | 40 | 14.4 | 164.7 | 2H | 5B | 400+ | 8 in lbs. | 0 |
| 3o | 30 | 40 | 36.7 | 172.6 | 2H | 1B | 400+ | 0 in lbs. | 0 |
| 3p | 20 | 50 | 34.2 | 164 | 2H | 1B | 400+ | 8 in lbs. | 0 |
| 3q | 25 | 50 | 17.9 | 189.7 | 3H | 4B | 400+ | 0 in lbs. | 0 |
| 3r | 30 | 50 | 38.9 | 199 | 2H | 0B | 400+ | 4 in lbs. | 0 |
| 3s | 20 | 60 | 16.4 | 179.7 | 2H | 4B | 400+ | 2 in lbs. | 0 |
| 3t | 25 | 60 | 20.7 | 209.3 | 2H | 3B | 400+ | 0 in lbs. | 0 |
| 3u | 30 | 60 | 24.3 | 215.9 | 3H | 0B | 400+ | 0 in lbs. | 0 |

TABLE 6-continued

Acetoacetylated Kraft Lignin, 1,4 Butanediol Coatings Cured with Cymel 301.

| Coating | % MF | Wt. % Lignin | Avg. Film Thickness | Konig Pendulum Hardness | Pencil Hardness | Crosshatch Adhesion | MEK Double Rubs | Reverse Impact | Mandrel Bend |
|---|---|---|---|---|---|---|---|---|---|
| 3v | 20 | 70 | 22.8 | 210.7 | 4H | 3B | 400+ | 2 in lbs. | 0 |
| 3x | 25 | 70 | 21.3 | 199 | 2H | 0B | 400+ | 2 in lbs. | 0 |
| 3y | 30 | 70 | 26 | 206 | 2H | 0B | 400+ | 0 in lbs. | 0 |

Initial amine-curing evaluations to make coatings were done by mixing in the amine functional resin, Amicure PACM (4,4'-Methylenebiscylcohexylamine), with the AAKLP resin, EK-102-1. The mixture heated up immediately and began to off-gas water vapor as a byproduct of the curing reaction. The mixture was immediately coated onto steel panels. However, the viscosity would increase so much that complete coatings could not be made. Because of the speed of this crosslinking reaction the amines were blocked using a stoichiometric amount of acetone. However the resulting coatings had a low value of MEK double rubs (<50), which indicated little crosslinking had occurred.

Example 4

Acetoacetylated Kraft Lignin and Polyol (AAKLP) resins were made by varying the polyol using the procedure in Example 3. There is a clear change in the viscosity of the resins based on the polyol component of the resins. See Table 7.

TABLE 7

Viscosity data in centipoise recorded at a rate of 100 Hz and 23° C.

| Lignin (Wt %) | Ethylene Glycol | Diethylene Glycol | Glycerol |
|---|---|---|---|
| 0 | 14.73 | 23.23 | 41.03 |
| 40 | 148.31 | 276.8 | 439.37 |

From these new AAKLP resins a variety of thermoset coatings have been made. The first group of thermosets made used the AAKLP resins listed above and Cymel 301, fully alkylated melamine formaldehyde crosslinker and para-toluenesulfonic acid as a catalyst. These thermoset coatings were cured using the following curing schedule: 130° C. for 10 minutes, ramp temperature up to 160° C. and cure at 160° C. for 30 minutes. After the curing schedule was completed the coatings were taken out of the oven and allowed to cool in ambient conditions for at least 24 hours before being tested. Coatings analysis was performed following the procedures outlined in the ASTM standards: Average Film Thickness, ASTM D6132-13; Konig Pendulum Hardness, ASTM D4366; Pencil Hardness, ASTM D3363; Crosshatch Adhesion, ASTM D3359-09; MEK double rubs, ASTM D5402; Impact Flexibility, ASTM D6905-03; and Mandrel bend, ASTM D522/D522M-13. Table 8 summarizes the results from the coatings characterization of the melamine formaldehyde coatings.

TABLE 8

Results from coatings characterization from AAKLP resins cured with Cymel 301 and 2% wt. pTSA as a catalyst. Coatings Characterized of diol/Kraft Lignin resins

| Coating | % MF | Polyol used | Weight Percent Lignin | Film Thickness | Konig Pendulum Hardness | Pencil Hardness | Crosshatch Adhesion | MEK Double Rubs | Reverse Impact | Mandrel Bend |
|---|---|---|---|---|---|---|---|---|---|---|
| 4-1 | 20 | Ethylene Glycol | 0 | 3.91 | 91.6 | Gouge 6H | 0B | 400+ | 1 | 0fail |
| 4-2 | 25 | Ethylene Glycol | 0 | 22.17 | 194 | Scratch 9H | 0B | 400+ | 0 | 0fail |
| 4-3 | 30 | Ethylene Glycol | 0 | 13.94 | 112 | ½ scratch 9H | 0B | 400+ | 0 | 0fail |
| 4-4 | 20 | Ethylene Glycol | 40 | 9.83 | 132.67 | Scratch 9H | 0B | 400+ | 1 | 0fail |
| 4-5 | 25 | Ethylene Glycol | 40 | 22.42 | 206.67 | 9H Pass | 2B-1B | 400+ | 0 | 0fail |
| 4-6 | 30 | Ethylene Glycol | 40 | 23.5 | 197.33 | 9H Pass | 0B | 400+ | 1 | 0fail |
| 4-7 | 20 | Glycerol | 0 | 23.94 | 96 | 7H | 0B | 400+ | 3 | 0pass |
| 4-8 | 25 | Glycerol | 0 | 27.7 | 177.33 | 0 | 0B | 290 | 5 | 0fail |
| 4-9 | 30 | Glycerol | 0 | 19.68 | 196.67 | 0 | 0B | 400+ | 1 | 0fail |
| 4-10 | 20 | Glycerol | 40 | | | | | | | |
| 4-11 | 25 | Glycerol | 40 | 22.82 | 218 | 9H Pass | 0B | 600+ | 1 | 0fail |
| 4-12 | 30 | Glycerol | 40 | | | | | | | |
| 4-13 | 20 | Diethylene Glycol | 0 | | | | | | | |
| 4-14 | 25 | Diethylene Glycol | 0 | 18.66 | 66 | Gouge 8H | 0B | 400+ | 0 | 0fail |

TABLE 8-continued

Results from coatings characterization from AAKLP resins cured with Cymel 301 and 2% wt. pTSA as a catalyst.
Coatings Characterized of diol/Kraft Lignin resins

| Coating | % MF | Polyol used | Weight Percent Lignin | Film Thickness | Konig Pendulum Hardness | Pencil Hardness | Crosshatch Adhesion | MEK Double Rubs | Reverse Impact | Mandrel Bend |
|---|---|---|---|---|---|---|---|---|---|---|
| 4-15 | 30 | Diethylene Glycol | 0 | 19.14 | 65 | Gouge 7H | 0B | 400+ | 1.75-2 | 0fail |
| 4-16 | 20 | Diethylene Glycol | 40 | 29.07 | 166.67 | 9H Pass | 0B | 400+ | 1 | 0fail |
| 4-17 | 25 | Diethylene Glycol | 40 | 33.01 | 156.67 | 9H Pass | 0B | 400+ | 1 | 0fail |
| 4-18 | 30 | Diethylene Glycol | 40 | 25.46 | 179.99 | 9H Pass | 0B | 400+ | 1 | 0fail |

Example 5

Curing with Diamines

Amine functional groups will readily react with the enolic hydroxyl group of the acetoacetate at room temperatures to form an enamine structure (Reaction 6, where the group P represents the base polymer, in this case lignin, and the group R represents the internal structure of a diamine). Because this crosslinking reaction occurs so quickly at room temperature, the polymer can have a short working pot life making it difficult to make coatings. In order to extend out the pot life we have explored using acetone to block the amine functional groups and slow the rate of reaction.

Reaction 6: crosslinking reaction between a diamine and acetoacetate functional groups.

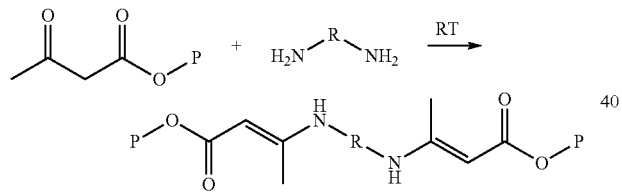

Amicure PACM (4,4'-Diaminodicyclohexyl methane) was used as a diamine to cure the resins. The PACM could be replaced by any primary diamine. For these coatings, PACM and acetone were mixed together before adding in the appropriate AAKL resin. Coatings were made on steal panels that had been cleaned using isopropyl alcohol. Coatings were made and allowed to cure at 80° C. for 1 hour to force the curing reaction to go to completion. Table 9 reports the results and characterization of these coatings.

TABLE 9

Coatings characterization testing for AAKLP resins made with 1,4 butanediol as the reactive diluent.

| Amine | Weight Percent Lignin | Average Film Thickness | Konig Pendulum Hardness | Pencil Hardness | Crosshatch Adhesion | MEK Double Rubs | Reverse Impact | Mandrel Bend |
|---|---|---|---|---|---|---|---|---|
| PACM | 0 | 56.4 | 14.7 | 6B | 0B | 10 | 168.6 in/lbs | pass |
| PACM | 10 | 41.8 | 14.7 | 5B | 0B | 8 | 168.6 in/lbs | pass |
| PACM | 20 | 34.9 | 33.7 | 4B | 0B | 15 | 23.5 in/lbs | pass |
| PACM | 30 | 33.7 | 47.3 | B | 0B | 8 | 23.5 in/lbs | pass |

TABLE 9-continued

Coatings characterization testing for AAKLP resins made with 1,4 butanediol as the reactive diluent.

| Amine | Weight Percent Lignin | Average Film Thickness | Konig Pendulum Hardness | Pencil Hardness | Crosshatch Adhesion | MEK Double Rubs | Reverse Impact | Mandrel Bend |
|---|---|---|---|---|---|---|---|---|
| PACM | 40 | 39.3 | 51.7 | B | 0B | 10 | 11.9 in/lbs | pass |
| PACM | 50 | 14.7 | 23.3 | HB | 0B | 9 | 11.9 in/lbs | pass |
| PACM | 60 | 31.4 | 89 | HB | 0B | 23 | 15.7 in/lbs | 1 cm |

In addition to force curing the acetoacetate/amine coatings the resins were also cured under ambient conditions to improve coatings properties by allowing the polymer a longer time to cure at a lower temperature. Properties were improved, though marginally, when this new curing schedule was implemented. Table 10 reports the results.

TABLE 10

Coatings characterization results from Amine cured AAKLP resins made with Ethylene glycol (EG), Diethylene Glycol (DEG), and Glycerol as reactive diluents and cured under ambient conditions.

| Amine | Coating | AAKL resin | Amine/AA molar ratio | Average film thickness | Konig Pendulum Hardness | Pencil Hardness | Crosshatch Adhesion | MEK Double Rubs | Reverse Impact | Mandrel Bend |
|---|---|---|---|---|---|---|---|---|---|---|
| PACM | 5-1 | 0% KL in DEG | 1:1 | 38.1 | 219.7 | F | 5B Pass | 11 | 7.84 in/lbs | Fail |
| PACM | 5-2 | 40% KL in DEG | 1:1 | 143.7 | 80 | 2B | 2B | 16 | 7.84 in/lbs | 0 Pass |
| PACM | 5-3 | 0% KL in EG | 1:1 | 60.5 | 185 | H | 0B | 15 | 0 | Fail |
| PACM | 5-4 | 40% KL in EG | 1:1 | 54.5 | 162.7 | 2H | 1B | 14 | 3.92 in/lbs | Fail |
| PACM | 5-5 | 0% KL in Glycerol | 1:1 | 39.9 | 147 | 8B | 2B | 105 | 0 | Fail |
| PACM | 5-6 | 40% KL in Glycerol | 1:1 | 29.4 | 171 | 3H | 1B | 160 | 0 | Fail |

Example 6

Michael Addition Curing

Curing of acetoacetate resins can also readily occur at room temperature through curing with electron deficient olefins. This curing reaction happens under basic conditions (Reaction 7, where R' represents lignin/reactive diluent and R" represents any group to which acrylate can be reacted including any simple polyol (diol triol, etc.), a polymer or oligomer (such as a polyether or polyester, polyurethane or epoxy)), which means that catalyst selection can play a role in pot life and curing speed.

Reaction 7: Michael reaction between an elecron deficient olefin (diacrylate) and the acetoacetate functionalized polymer/reactive diluent.

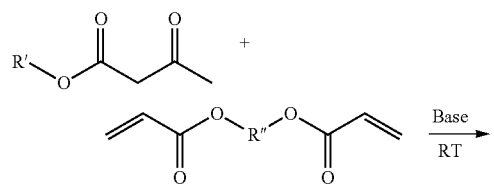

-continued

Coatings have been made by curing a variety of AAKLP resins with Sartomer SR 415 (Ethoxylated(20) trimethylolpropane triacrylate). The catalyst that we are currently using is 1,8-Diazabicyclo[5.4.0]undec-7-ene (DBU) at a catalyst loading of 0.5% by weight. At this catalyst loading, coatings have taken longer than 48 hours to cure completely, so we are testing the effects of increasing the catalyst loading. Table 11 lists the results from the coatings.

TABLE 11

Result from coatings characterization of AAKLP resins cured with Sartomer SR 415 and DBU as a catalyst.

| Coating | AAKL resin | Acrylate | MEK Double Rubs | Konig Pendulum Hardness | Mandrel Bend | Reverse Impact | Film Thickness | Gloss | Pencil Hardness | Adhesion |
|---|---|---|---|---|---|---|---|---|---|---|
| 6-1 | 0% KL in DEG | SR415 | 20 | 18 | 0 in Pass | >168 in/lbs | 60.5 | 20° - 67.7 60° - 85.5 85° - 98.8 | 8B | 1B |
| 6-2 | 40% KL in DEG | SR415 | | | | | | 20° - 60° - 85° - | | |
| 6-3 | 0% KL in EG | SR415 | 7 | 22.3 | 0 in Pass | >168 in/lbs | 17.2 | 20° - 75.7 60° - 86.3 85° - 98.2 | 8B | 1B |
| 6-4 | 40% KL in EG | SR415 | | | | | | 20° - 60° - 85° - | | |
| 6-5 | 0% KL in Glycerol | SR415 | | | | | | 20° - 60° - 85° - | | |
| 6-6 | 40% KL in Glycerol | SR415 | | | | | | 20° - 60°- 85° - | | |

Example 7

Methacrylated Lignins

The synthesis of methacrylated Kraft Lignin resin is carried out as follows: Kraft lignin (Indulin AT from Mead-Westvaco), polyol, methacrylic anhydride, and 4-Dimethyl-aminopyridine (DMAP) were all measured out into a 1-liter resin kettle. A mechanical stirrer with a stirring rod and a thermocouple were attached to the top of the resin kettle. The loaded resin kettle was placed in a heating mantle. The methacrylation reaction was run at 45° C. for a set amount of time. Reactions were tracked for completion using acid number titration. The acid number would increase over the course of the reaction until it reached a plateau, which indicated that the hydroxyl groups had all been reacted with the methacrylic anhydride and no additional methacrylic acid is being produced. The ratio of Kraft Lignin to polyol was varied systematically to better understand how the addition of more Kraft lignin would affect the resulting properties of the cured material. The amount of Kraft lignin was varied from 0-40% by weight compared to the polyol, which were varied from 60-100% by weight.

When the synthesis was complete the methacrylated lignin resin was allowed to cool to room temperature before being thoroughly washed using a saturated sodium bicarbonate solution to remove the excess methacrylic acid. The resin was washed 3 times to be certain that all of the excess acid had been removed. Washing the excess methacrylic acid often became problematic because the organic resin did not separate well from the sodium bicarbonate solution. Water would often get trapped within the washed resins which made poor samples when they were polymerized. The "crude" resin mixture still contained the methacrylic acid. Both the crude resin and the washed resins were used in the polymerization (curing) reactions. Table 12 summarizes the synthesis reactions carried out of the methacrylated Kraft lignin and polyols.

TABLE 12

List of reactions carried out to create methacrylated Kraft lignin and polyol resins.

| Experiment | Diol | Diol (wt %) | Diol (g) | Solvent | Lignin (wt %) | Lignin (g) | Catalyst (g) | Methacrylic Anhydride (g) | Reaction Time (hr) |
|---|---|---|---|---|---|---|---|---|---|
| 1 | Ethylene Glycol | 100 | 25 | None | 0 | 0 | 0.98 | 136.22 | 24 |
| 2 | Diethylene Glycol | 100 | 42.42 | None | 0 | 0 | 0.99 | 136.49 | 22 |
| 3 | Diethylene Glycol | 90 | 31.18 | None | 10 | 3.38 | 0.69 | 103.39 | 24 |
| 4 | Ethylene Glycol | 90 | 30 | None | 10 | 3.34 | 1.18 | 167.42 | 26 |
| 5 | Diethylene Glycol | 80 | 24.05 | None | 20 | 6.05 | 0.56 | 83.16 | 22 |
| 6 | Ethylene Glycol | 80 | 24.15 | None | 20 | 6.01 | 0.94 | 137.52 | 26 |

TABLE 12-continued

List of reactions carried out to create methacrylated Kraft lignin and polyol resins.

| Experiment | Diol | Diol (wt %) | Diol (g) | Solvent | Lignin (wt %) | Lignin (g) | Catalyst (g) | Methacrylic Anhydride (g) | Reaction Time (hr) |
|---|---|---|---|---|---|---|---|---|---|
| 7 | Diethylene Glycol | 90 | 27.17 | None | 10 | 3.04 | 0.62 | 91.54 | 26 |
| 8 | Diethylene Glycol | 70 | 21.03 | None | 30 | 9.02 | 0.59 | 76.71 | 26 |
| 9 | Ethylene Glycol | 70 | 21.51 | None | 30 | 9.07 | 0.6 | 124.29 | 25 |
| 10 | Diethylene Glycol | 60 | 18.04 | None | 40 | 12.04 | 0.61 | 70.8 | 19 |
| 11 | Ethylene Glycol | 60 | 18.03 | None | 40 | 12 | 0.59 | 111.44 | 19 |
| 12 | 1,4 Butanediol | 70 | 21.1 | None | 30 | 9.06 | 0.61 | 88.69 | 21 |
| 13 | 1,5 Pentanediol | 70 | 21.15 | None | 30 | 9.07 | 0.61 | 78.16 | 19 |
| 14 | 1,6 Hexanediol | 70 | 21.37 | MEK (200 ml) | 30 | 9.02 | 0.6 | 69.93 | 23 |
| 15 | 1,6 Hexanediol | 70 | 21.07 | MEK (200 ml) | 30 | 9.01 | 0.6 | 64.44 | 24 |
| 16 | 1,6 Hexanediol | 80 | 24.09 | MEK (200 ml) | 20 | 6.07 | 0.6 | 68.99 | 24 |
| 17 | Diethylene Glycol | 70 | 42 | MEK 28.78 g | 30 | 18.03 | 1.27 | 82.05 | 96 |
| 18 | 1,6 Hexanediol | 60 | 18.1 | MEK (200 ml) | 40 | 12.04 | 0.61 | 60.4 | 96 |
| 19 | 1,6 Hexanediol | 90 | 27 | MEK (200 ml) | 10 | 3.07 | 0.62 | 73.8 | 47 |
| 20 | Diethylene Glycol | 70 | 42 | MEK 28.59 g | 30 | 17.97 | 1.26 | 80.23 | 72 |

Example 8

Methacrylated Polyol-Kraft Lignin-Versatic Acid Resins

Methacrylated polyol-Kraft lignin-versatic acid resins were synthesized using a two step process. First, Kraft lignin was solubilized in a chosen polyol (e.g., diethylene glycol). Next, an appropriate amount of methacrylic anhydride was added to functionalize all hydroxyl groups present in the Kraft lignin-polyol mixture. Dimethylaminopyridine (DMAP) was used as a catalyst for the functionalization step (Reaction 3). This reaction was carried out at 45° C. for 24 hours. Potentiometric acid number titration was used to monitor the production of methacrylic acid in the reaction mixture. The acid number of the reaction mixture after 24 hours was used to calculate the amount of Cardura E-10P that would be added to the reaction mixture for the second step of the resin synthesis.

Once the amount of methacrylic acid in the resin was determined, an appropriate (stoichiometric) amount of Cardura E-10P was added to the reaction mixture along with benzyl trimethyl ammonium chloride (BTMAC) as catalyst at 1% weight percent. The methacrylic acid reacts with the pendent epoxy group of the Cardura E-10P to form a methacrylated versatic acid (Reaction 4). The second step of the reaction was run at 90° C. for an additional 24 hours. Acid number titration was performed after 24 hours to ensure that all the excess methacrylic acid had been consumed. The final resin was then characterized using an ARES Rheometer to measure viscosity and FTIR to confirm the functionality of the resin.

Characterization of Resin:

A variety of techniques characterized each of the resins after synthesis. FTIR was used to characterize the functional groups present in the resin (note that resins that contained residual water from being washed were not analyzed with FTIR). In addition to FTIR, the resins were also characterized using NMR, GPC, and the ARES rheometer. NMR spectra were obtained and used to confirm the structure. GPC was used to help understand more about the size of the modified lignin. Because GPC compares the sample to linear polystyrene standards, it is difficult to tell the exact molecular weight of the nonlinear methacrylated lignin. After characterization of the resins, the resins were cured using thermal free radical initiators to polymerize.

Figure 5:
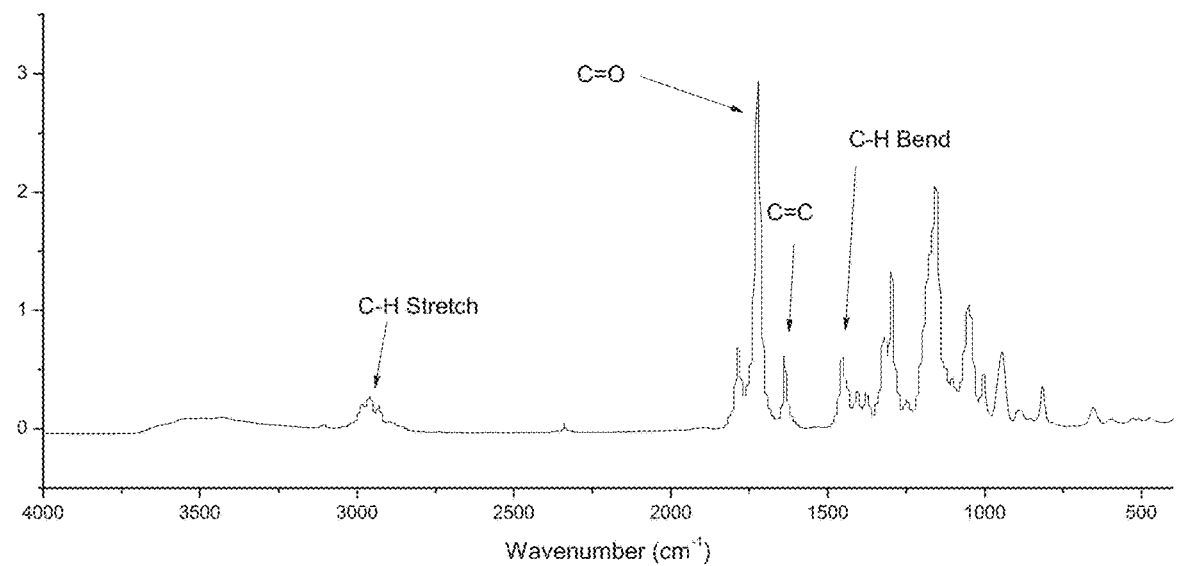
FIG. 5 depicts the FTIR spectrum of methacrylated ethylene glycol.

FTIR spectra of all synthesized resins (which did not contain residual water) were taken. All spectra show strong C=O stretching around 1715 $cm^{-1}$, and C=C stretching near 1670 $cm^{-1}$. Finally, there is a band just below 3000 $cm^{-1}$, which is indicative of C—H stretching as well as C—H bending at 1470 $cm^{-1}$. These bands suggest that methacrylate groups are present. The reduction of the OH band suggest that the majority of the hydroxyl groups have been functionalized. FIG. 5 shows an example FTIR spectrum of methacrylated ethylene glycol.

Figure 6:
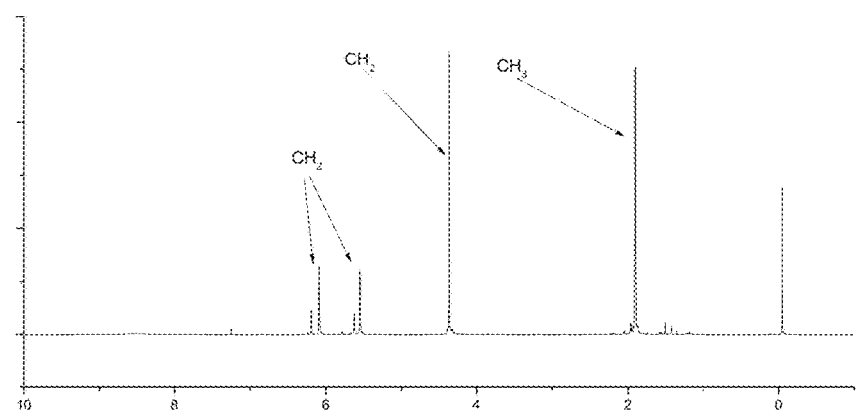
FIG. 6 depicts the proton NMR of methacrylated ethylene glycol with $CDCl_3$ as a solvent.

The proton NMR spectrum of the methacrylated ethylene glycol (FIG. 6) shows some very distinct peaks. The peak that is at 1.9 ppm is the methyl group on the acrylate functionality. At 4.2 ppm there is a peak which corresponds to the alkene $CH_2$ of the methacrylate groups. Finally, there are two peaks that correspond to the alkyl $CH_2$ groups at 5.7 ppm and 6.1 ppm. This spectrum along with the FTIR spectra helps us confirm that we have successfully made methacrylated ethylene glycol. The FTIR and NMR spectra of the lignin-containing materials show similar characteristic peaks, but have additional peaks and are more complex due to the complex nature of the lignin.

Characterization of these resins also included viscosity measurements that were performed on an ARES rheometer.

Figure 7:
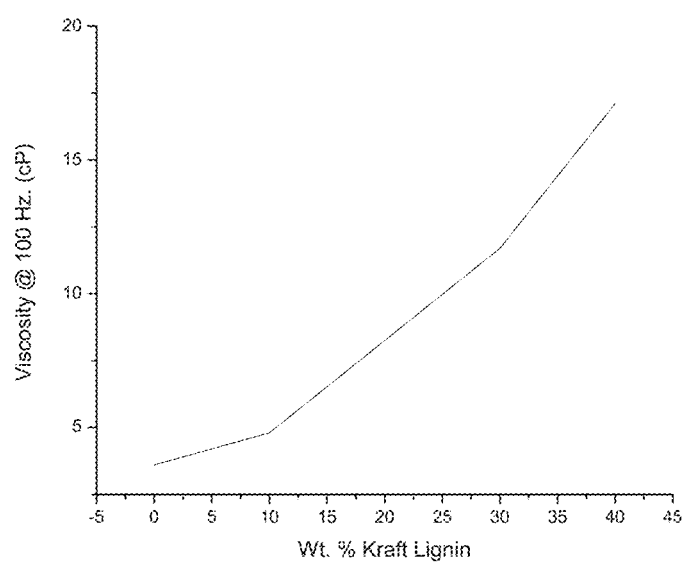
FIG. 7 is a graph of the viscosity in centipoise of the methacrylated diethylene glycol and Kraft lignin resins as a function of the weight percentage of Kraft lignin.

All viscosity measurements were recorded at room temperature (approximately 22° C.). Viscosity measurements were taken at a rate of 100 Hz. in pascal seconds, which were then converted to centipoise. FIG. 7 shows how the viscosity of the methacrylated diethylene glycol and Kraft lignin resins (crude) changed as the weight percentage of Kraft lignin was increased. The viscosity increased as we incorporated a greater fraction of Kraft lignin into the methacrylated resin synthesis.

Curing of Methacrylated Kraft Lignin and Methacrylated Polyol Resins:

In order to cure the methacrylated Kraft lignin and polyol resins, the resins were mixed with a thermal free radical initiator. In the initial stages of making samples for dynamic mechanical analysis, the initiator was varied between Trigonox 239, Luperox P, and Luperox A98. In addition to varying the type of initiator catalyst, the catalyst loading was also varied from 1, 2, 5, and 10 weight % of the formulation. Both the crude reaction mixtures (still contains the methacrylic acid) and the washed reaction mixtures (methacrylic acid washed out) were cured.

The resins were cured for 4 hours at 80° C. and 2 hours at 110° C. The materials could be cured to hard glassy thermosets.

Figure 8:
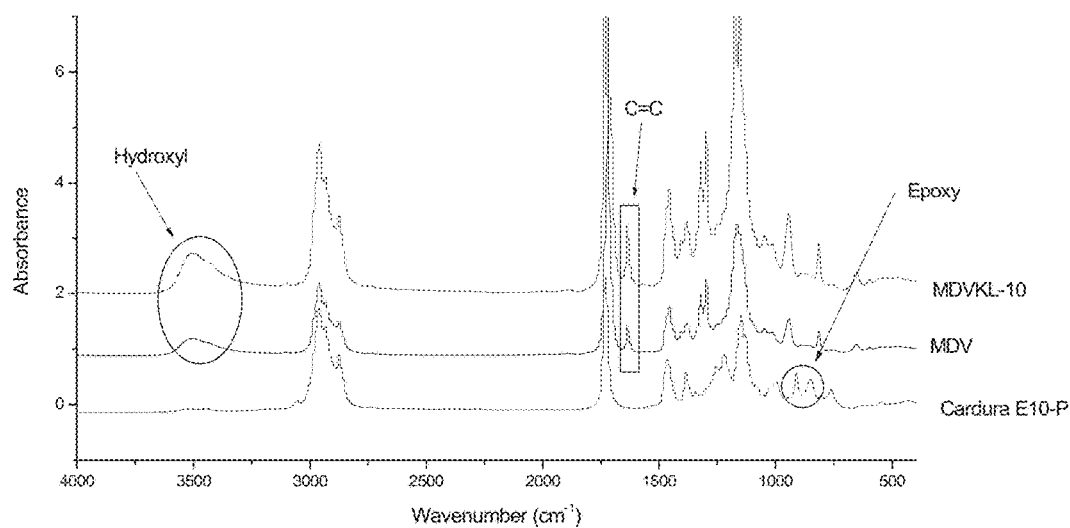
FIG. 8 shows the FTIR spectra of Cardura E-10P and Versatic acid modified resins: methacrylated diethylene glycol and methacrylated versatic acid (MDV) and methacrylated diethylene glycol, methacrylated Kraft lignin, and methacrylated versatic acid (MDVKL-10).

Characterization of Methacrylated Polyol-Kraft Lignin-Versatic Acid Resin:

The final resin, comprised of methacrylated polyol-Kraft lignin-versatic acid mixture, was characterized by FTIR analysis. IR spectroscopy allows us to see different functional groups present in a material. FIG. 8 shows the IR absorbance of the starting material Cardura E-10P along with the final resins with 0% and 10% Kraft lignin respectively. It is clearly shown that the epoxy group present in the Cardura E-10P is consumed after it has been reacted with the methacrylated Kraft lignin-polyol mixture. The hydroxyl band that is present in the FTIR of the resin also suggest that the epoxy has successfully reacted with the methacrylic acid to form a methacrylated versatic acid. It is also shown that the alkene functionality of the resin is preserved in the final resin because this is where polymerization takes place.

Figure 9:
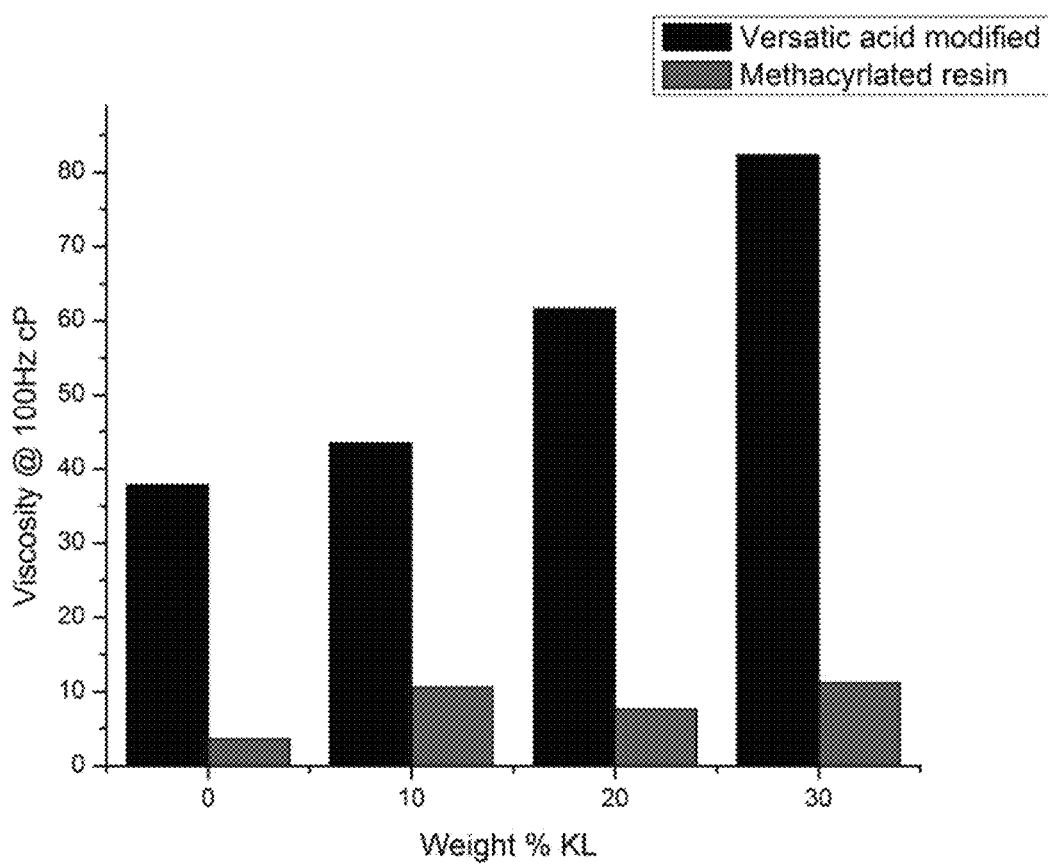
FIG. 9 shows a comparison of the viscosity of methacrylated Kraft lignin (red) and of the Versatic acid modified Kraft lignin resin (black) measured using the parallel plate geometry of the ARES viscometer at a rate of 100 Hz.

The final resin was also characterized using an ARES rheometer. Parallel plate geometry was used for all viscosity calculations and all viscosity measurements were taken at room temperature at a rate of 100 Hz; FIG. 9 shows the data. There is a clear trend of increasing viscosity with an increase in the weight percentage of Kraft lignin present in the resin. Viscosity of the final resin was also much greater than the viscosity of methacrylated Kraft lignin-polyol and methacrylic acid resin.

Curing of Methacrylated Polyol-Kraft Lignin-Versatic Acid Resin:

The final resin mixture of methacrylated Kraft lignin-polyol-versatic acid (MKLPVA) was cured using a free radical initiator. The most ideal conditions for curing used benzoyl peroxide as a thermal initiator and a curing schedule of 7° C. for 1 hour, 90° C. for 1 hour, and 150° C. for 2 hours. Benzoyl peroxide was first dissolved in the resin using a Flacktek highspeed mixer. Resin was then transferred to molds to be cured. The cured MKLPVA materials were tested for a variety of materials properties. A modified version of percent solids was used to characterize the amount of resin that ends up in the cured materials. Sol-gel extraction and ATR-FTIR were used to track the extent of polymerization. The glass transition temperature of the cured materials was assessed using both Thermal Mechanical Analysis (TMA) and Dynamic Mechanical Analysis (DMA).

Figure 10:
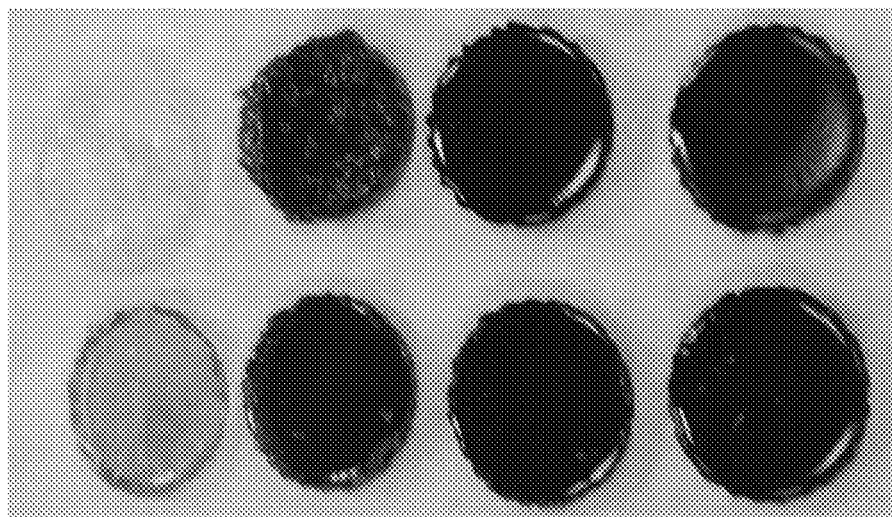
FIG. 10 shows cured methacrylate materials: cured methacrylated Kraft lignin-diethylene glycol-methacrylic acid materials (MKLDEGVA) (top row) with increasing lignin content 0%, 10%, 20%, and 30% from left to right, and cured methacrylated Kraft lignin-diethylene glycol-versatic acid (bottom row) with increasing lignin content 0%, 10%, 20%, and 30% from left to right.

Characterization of Cured Methacrylated Polyol-Kraft Lignin-Versatic Acid Resin:

Cured materials (FIG. 10) formed more uniform samples with fewer defects when compared to the resins that were not modified with Cardura E-10P. A modified percent solids experiment as used to assess the amount of resin that is incorporated into the final cured materials. Because this resin is comprised of all methacrylate functional materials, theoretically materials should be 100% solids.

For the modified percent solids experiment benzoyl peroxide (5% by weight) was first dissolved in each resin. Next, a set amount of resin (approx. 2 g) was measured out into small aluminum pans. Resins were cured using the following curing schedule 70° C. for 1 hour, 90° C. for 1 hour, and 150° C. for 2 hours. The weight of uncured resin in each pan was recorded and the final weight of the cured material was recorded. These weights were used to determine the percentage of uncured resin that was incorporated into the final cured material. Table 13 shows the results from the modified percent solids experiment. All materials show a high conversion of resin to thermoset.

TABLE 13

Results from the modified percent solids experiment.

| Trial | 0% KL | 10% KL | 20% KL | 30% KL |
|---|---|---|---|---|
| 1 | 95.12% | 96.14% | 95.07% | 87.62% |
| 2 | 96.52% | 97.06% | 95.59% | 89.71% |
| 3 | 96.86% | 96.59% | 95.07% | 90.15% |
| 4 | 96.59% | 96.08% | 95.05% | 90.56% |
| 5 | 95.00% | 94.92% | 94.38% | 88.24% |
| Average | 96.02% | 96.15% | 95.03% | 89.25% |

Figure 11:
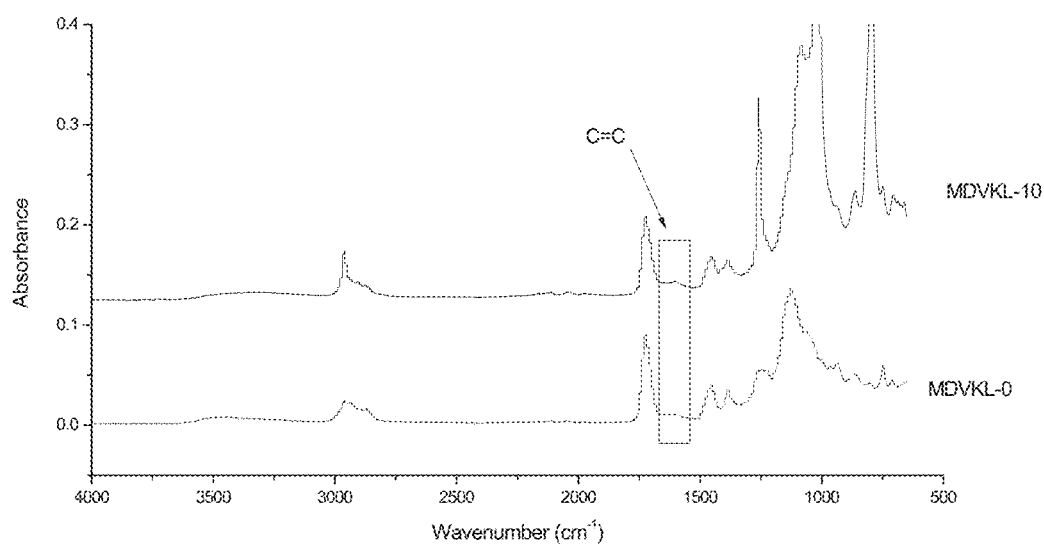
FIG. 11 shows the ATR-FTIR of cured MKLPVA resins, which show the absence of alkene carbon-carbon stretching.

Cured MKLDEGVA resins were also assessed using ATR-FTIR to see what functional groups are present in the final cured materials. FIG. 11 shows the ATR-FTIR, which shows a significant reduction in the alkene (C=C) groups present. This reduction in the alkene band suggests polymerization through the alkene creating an alkyl chain.

Sol-gel extraction was performed on the cured materials to assess what fraction of the material is incorporated into the thermoset network and what portion is still soluble. Cured samples were weighed and wrapped in filter paper, before being placed in Soxhlet extraction thimbles. Extractions were done in a Soxhlet extractor for 24 hours using dichloromethane as the solvent. After extraction, the samples were taken out of the filter paper and allowed to dry for 72 hours before being re-weighed. The weight of the samples after extraction was then used as the percentage of the cured materials that was incorporated into the thermoset network (% gel). Table 14 shows a summary of the results from this experiment. Results suggest that the resin is highly crosslinked by the chosen curing schedule.

TABLE 14

Results from sol-gel extraction experiments performed on the MKLPVA cured materials.

| Methacrylated kraft lignin resin | % Gel |
|---|---|
| 0% | 97.1% |
| 10% | 97.2% |
| 20% | 93.0% |
| 30% | 87.5% |

Figure 12:
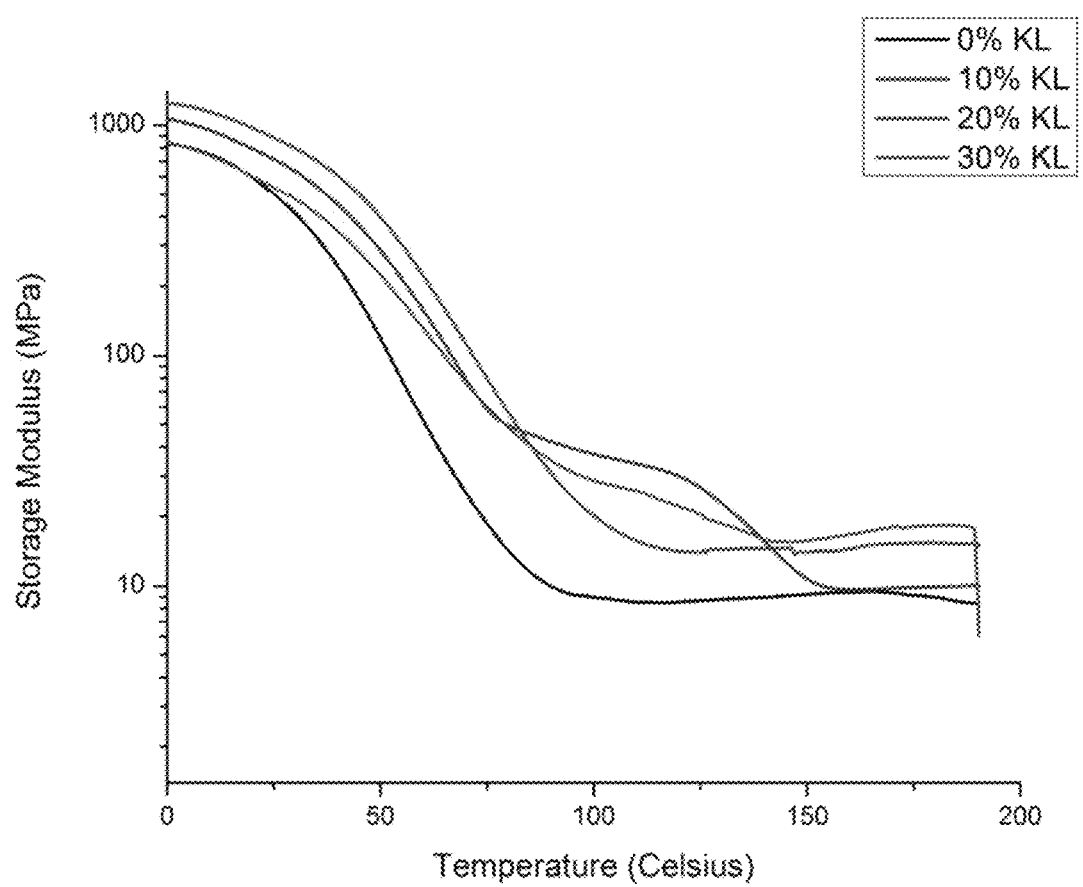
FIG. 12 shows the storage modulus graph of cured MKLDEGVA resins. DMA experiments were conducted using a dual cantilever experiments.
Figure 13:
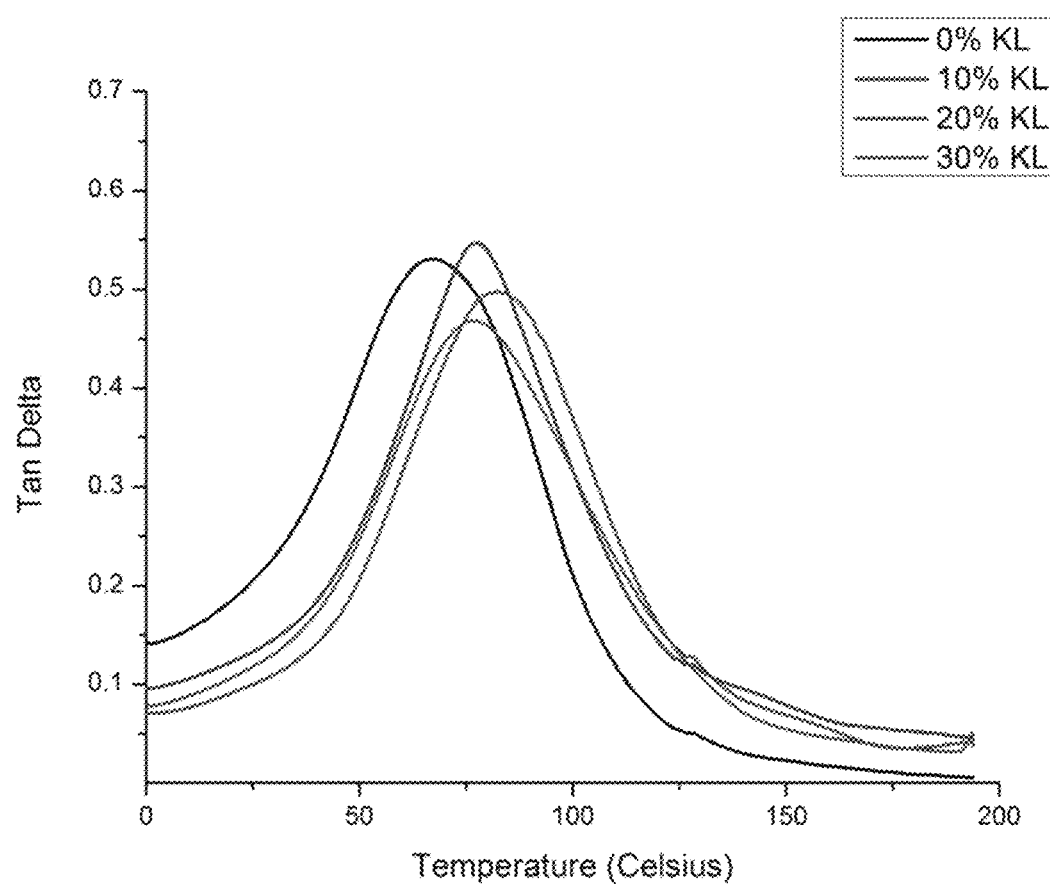
FIG. 13 shows the tan delta curve of MKLDEGVA cured materials. The peak of tan delta curves were used to calculate the glass transition temperatures of the materials.

Thermal analysis of the cured MKLDEGVA was done both with DMA and TMA to calculate the glass transition temperature of the cured materials. From the DMA results the crosslink density (XLD) can also be calculated. Table 15 shows a summary of the results from the thermal analysis. FIGS. 12 and 13 show the storage modulus and tan delta curves produced during DMA analysis. DMA experiments were done in a dual cantilever experimental setup. All DMA samples were cured in poly-dimethylsiloxane (PDMS) molds. Samples made for TMA were cured in small aluminum pans.

TABLE 15

Summary of the results for DMA and TMA experiments.

| DMA results MKLDEGVA KL:DEG | TMA Tg (Celcius) | DMA Tg (Celcius) | Young's Modulus @$T_g$ + 60° C. (MPa) | XLD (mol/m$^3$) |
|---|---|---|---|---|
| 0:100 | 91.21 | 67.40 | 8.73 | 874.70 |
| 10:90 | 96.93 | 81.30 | 14.60 | 1413.40 |
| 20:80 | 88.88 | 77.10 | 16.31 | 1594.30 |
| 30:70 | 90.43 | 76.80 | 14.68 | 1436.20 |

The methacrylated kraft lignin/polyol/versatic acid resins synthesized show that as a greater weight percentage of lignin is incorporated into the resin the viscosity of the uncured materials increases. These resins have also been cured using benzoyl peroxide as a free radical initiator and a curing schedule of 70° C. for 1 hour, 90° C. for 1 hour, and 150° C. for 2 hours. The resin showed a low VOC content and a high degree of crosslinking. Cured materials also showed a high $T_g$. The incorporation of additional lignin did not have an apparent effect on the $T_g$ or degree of polymerization.

The claimed invention is:

1. An acetoacetylated lignin resin composition, comprising the reaction product of a mixture of lignin and at least one polyol with an acetoacetate ester.

2. The acetoacetylated lignin resin composition of claim 1, wherein at least a fraction of the hydroxyl groups on the lignin are substituted with acetoacetate groups.

3. The acetoacetylated lignin resin composition of claim 1, wherein the hydroxyl groups on the lignin are fully substituted with acetoacetate groups.

4. The acetoacetylated lignin resin composition of claim 1, wherein the hydroxyl groups on the polyol are substituted with acetoacetate groups.

5. The acetoacetylated lignin resin composition of claim 1, wherein the acetoacetate ester is tertiary-butyl acetoacetate.

6. The acetoacetylated lignin resin composition of claim 1, wherein the at least one polyol is selected from the group consisting of a diol, a triol, and mixtures thereof.

7. The acetoacetylated lignin resin composition of claim 6, wherein the diol is selected from the group consisting of diethylene glycol, 2-butyl-2-ethyl-1,3-propanediol, ethylene glycol, 1,2-propanediol, 1,3-propanediol, 2-methyl-1,3-propanediol, 1,4-butanediol, 2,3-butanediol, 1,5-pentanediol, 1,6-hexanediol, 1,4-cyclohexanedimethanol, neopentyl glycol, and mixtures thereof.

8. The acetoacetylated lignin resin composition of claim 6, wherein the triol is selected from the group consisting of trimethylolpropane, trimethylolethane, glycerol, and mixtures thereof.

9. The acetoacetylated lignin resin composition of claim 1, wherein:
the lignin is Kraft lignin;
the polyol is selected from the group consisting of 1,4-butanediol, diethylene glycol, ethylene glycol, and glycerol; and
the acetoacetate ester is tertiary-butyl acetoacetate.

10. The acetoacetylated lignin resin composition of claim 1, further comprising at least one additive.

11. A method for producing the acetoacetylated lignin resin composition of claim 1, comprising the step of contacting lignin with the acetoacetate ester in the presence of the at least one polyol, and optionally, a catalyst.

12. A curable composition comprising the acetoacetylated lignin resin composition of claim 1 and a multifunctional amine, or a melamine formaldehyde resin and a catalyst, or a multifunctional acrylic acid ester and a catalyst.

13. A cured composition of claim 12.

14. An article of manufacture, comprising the curable composition of claim 12.

15. A substrate coated with the curable composition of claim 12.

16. The substrate of claim 15, wherein the substrate is selected from the group consisting of paper, polyester film, metal, glass, and urethane elastomers.

* * * * *